United States Patent
Ito et al.

(10) Patent No.: US 6,759,812 B2
(45) Date of Patent: Jul. 6, 2004

(54) DISCHARGE LAMP LIGHTING CIRCUIT FOR DETECTING FAILURE OF A SWITCHING ELEMENT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/232,540

(22) Filed: Aug. 30, 2002

(65) Prior Publication Data
US 2003/0057869 A1 Mar. 27, 2003

(30) Foreign Application Priority Data
Aug. 30, 2001 (JP) .......................................... 2001-261369

(51) Int. Cl.[7] ................................................ G05F 1/00
(52) U.S. Cl. ......................... 315/291; 315/307; 315/312
(58) Field of Search ................................ 315/291, 307, 315/224, 312, 209 R, 367

(56) References Cited

U.S. PATENT DOCUMENTS 6,034,487 A * 3/2000 Yamashita et al. .......... 315/244
6,175,190 B1 * 1/2001 Yamashita et al. .......... 315/127

FOREIGN PATENT DOCUMENTS

JP          2001-257092          9/2001

* cited by examiner

Primary Examiner—Tuyet T. Vo
(74) Attorney, Agent, or Firm—Fish & Richardson P.C.

(57) ABSTRACT

A discharge lamp lighting circuit 1 has a DC-DC conversion circuit 3 for receiving DC power supply and converting the input voltage into positive and negative output voltages and a DC-AC conversion circuit 4 having a plurality of half bridges for receiving the output voltages of the DC-DC conversion circuit and outputting either positive or negative voltage. It is provided with an anomaly detection circuit 8, if the positive and negative output voltages or the output voltages of the half bridges become lower than a threshold value, for determining that a failure occurs in any of the components making up the half bridge. A command is issued for turning off the components of the half bridge wherein the failure occurs, and the operation of the DC-DC conversion circuit 3 corresponding to the voltage polarity to be output by the half bridge is stopped.

19 Claims, 16 Drawing Sheets

DISCHARGE LAMP LIGHTING CIRCUIT FOR DETECTING FAILURE OF A SWITCHING ELEMENT

BACKGROUND OF THE INVENTION

This invention relates to an art for taking prompt protection measures against a failure of a switching element that can be caused by an arc surge, etc., and guaranteeing lighting of the discharge lamp connected to the bridge consisting of normal switching elements in a lighting circuit that can light a plurality of discharge lamps.

The configuration of a lighting circuit of a discharge lamp, such as a metal halide lamp, comprising a DC-DC conversion circuit, a DC-AC conversion circuit, and a starter circuit is known. For example, to light one discharge lamp, a configuration comprising a DC-DC converter, a full-bridge-type circuit (circuit configured so as to alternately perform on/off control for switching elements making up two arms), and their control circuit can be named. As the switching elements in the DC-DC converter are controlled, output of the DC-DC converter is controlled and AC output provided by the full-bridge-type circuit following the DC-DC converter is supplied to the discharge lamp. Each arm of the full-bridge-type circuit is made up of two switching elements. The connection point of the switching elements making up one arm is connected to one end of the discharge lamp through the starter circuit and an opposite end of the discharge lamp is connected to the connection point of the switching elements making up the other arm.

By the way, when the number of discharge lamps is two, if lighting circuits are provided in a one-to-one correspondence with the discharge lamps for lighting the discharge lamps, it is disadvantageous for the number of parts and the costs and therefore preferably the lighting circuits for the two discharge lamps are made common. For example, the DC-DC converter is configured so as to provide positive output and negative output, the full-bridge-type circuit forming a DC-AC conversion circuit is made up two half bridges, power is supplied to the first discharge lamp through a starter circuit by one arm, and power is supplied to the second discharge lamp through a starter circuit by the other arm. That is, as the switching elements in the DC-DC converter are controlled, output of the DC-DC converter is controlled and when the rectangular wave output provided by the alternation operation according to the switching elements of each of the arms making up the full-bridge-type circuit is supplied to the discharge lamp, positive output and negative output are alternately supplied to each discharge lamp (namely, when positive output is input to one discharge lamp, negative output is input to the other).

However, in the circuit configuration in the related art, if either of the switching elements making up each of the arms of the full-bridge-type circuit fails (for example, when a field-effect transistor is used, short-circuit destruction between drain and source), its anomaly detection is not easy and insufficient or excessive protection measures cause a detriment to occur; this is a problem.

That is, in the configuration in which the full-bridge-type circuit is used to light one discharge lamp, when one switching element fails, if a through state occurs at the output stage of the DC-DC converter, supply voltage rapidly lowers and thus is compared with a predetermined voltage, whereby an anomaly can be detected easily. When it is determined that an anomaly occurs, if an instruction for turning off all switching elements making up the full-bridge-type circuit is issued, expansion of damage or harm caused by the failure of the switching element can be prevented; the situation is easy.

In contrast, in the configuration in which the full-bridge-type circuit is used to light two discharge lamps as described above, if the same concept as that with the number of discharge lamps being one is adopted, an anomaly cannot be detected by simple voltage comparison and sufficient circuit protection cannot be conducted or the detrimental effect accompanying issuance of an instruction for turning off all switching elements (for example, although one discharge lamp and the switching elements of the arm for driving the discharge lamp do not involve any problem, two discharge lamps are switched off because any switching element of the arm for driving the other fails. This introduces a problem as for the driving safety of the vehicle driver if application to the light source of vehicle light is considered; it is preferred to light the one discharge lamp (normal discharge lamp)) is involved. It becomes necessary to determine any of the switching elements making up which of both arms of the full-bridge-type circuit fails and also necessary to make it possible to reliably start the discharge lamp driven by the normal arm.

SUMMARY OF THE INVENTION

It is therefore an object of the invention to detect a switching element failure and take necessary and sufficient protection measures in a lighting circuit capable of separately lighting two discharge lamps using a DC-AC conversion circuit of a full-bridge-type configuration.

To the end, according to the invention, there is provided a discharge lamp lighting circuit comprising a DC-DC conversion circuit for receiving a DC input voltage and converting the voltage into positive and negative output voltages and a DC-AC conversion circuit having a plurality of half bridges for receiving the positive and negative output voltages provided by the DC-DC conversion circuit and outputting either positive or negative voltage, wherein power is supplied from each half bridge through a starter circuit to each discharge lamp, wherein an anomaly detection circuit, if the positive and negative output voltages or the output voltages of the half bridges become lower than a predetermined threshold value, for determining that a failure occurs in any of switching elements making up the half bridge.

Therefore, according to the invention, an abnormal state when a failure occurs in any of the switching elements making up the half bridge can be detected reliably.

DETAILED DESCRIPION OF THE PREFERRED EMBODIMENTS

Figure 1:
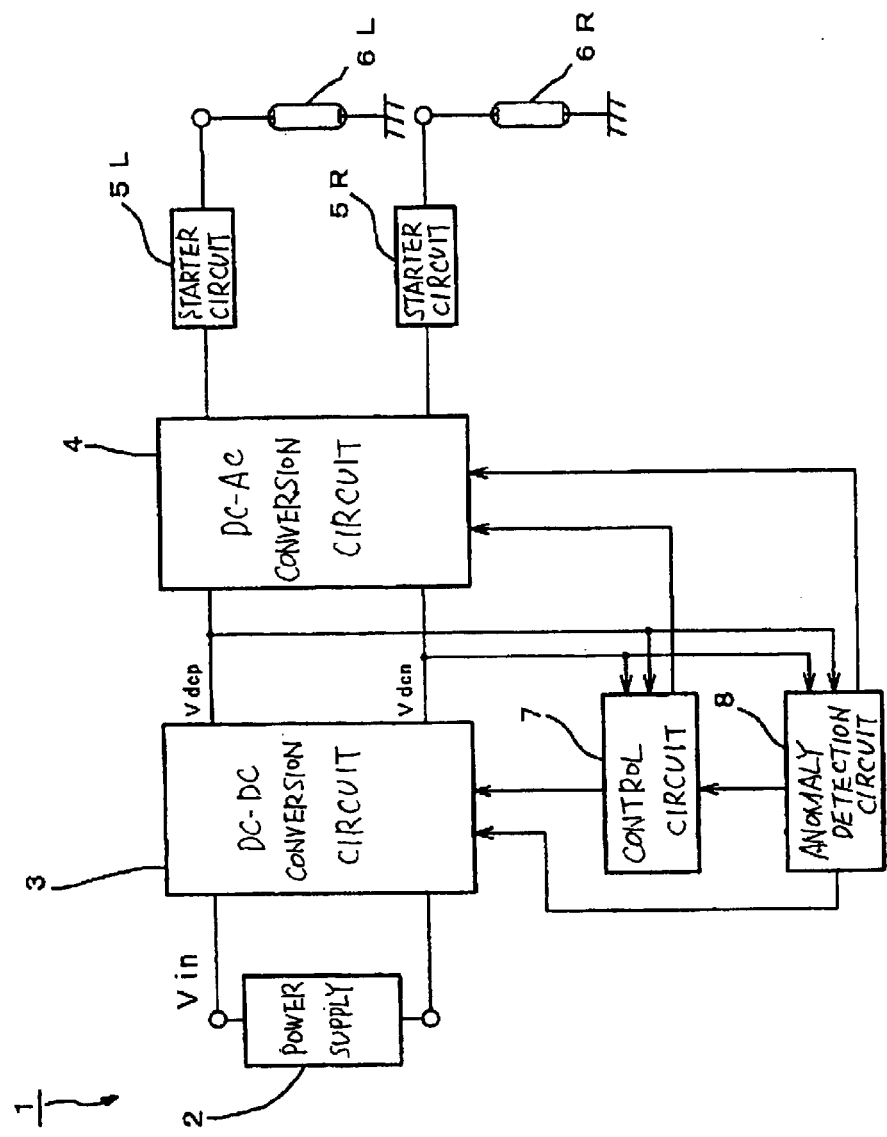
FIG. 1 is a circuit block diagram to show the basic configuration of a discharge lamp lighting circuit according to the invention.

FIG. 1 shows the basic configuration of a lighting circuit according to the invention. A discharge lamp lighting circuit 1 comprises a DC power supply 2, a DC-DC conversion circuit 3, a DC-AC conversion circuit 4, and starter circuits 5L and SR.

The DC-DC conversion circuit 3 receives DC input voltage (Vin) from the DC power supply 2 and converts the voltage into positive and negative output voltages. For example, it contains a transformer and a switching element and the switching element is controlled in response to a signal from a control circuit 7 and the output voltages are controlled. The DC-DC conversion circuit 3 uses a DC-DC converter having the configuration of a switching regulator (flyback type, etc.,). A configuration of non-separation type in which one circuit is provided for providing both positive output and negative output and a configuration of separation type in which separate circuits are provided for providing positive and negative output voltages can be named.

Figure 2:
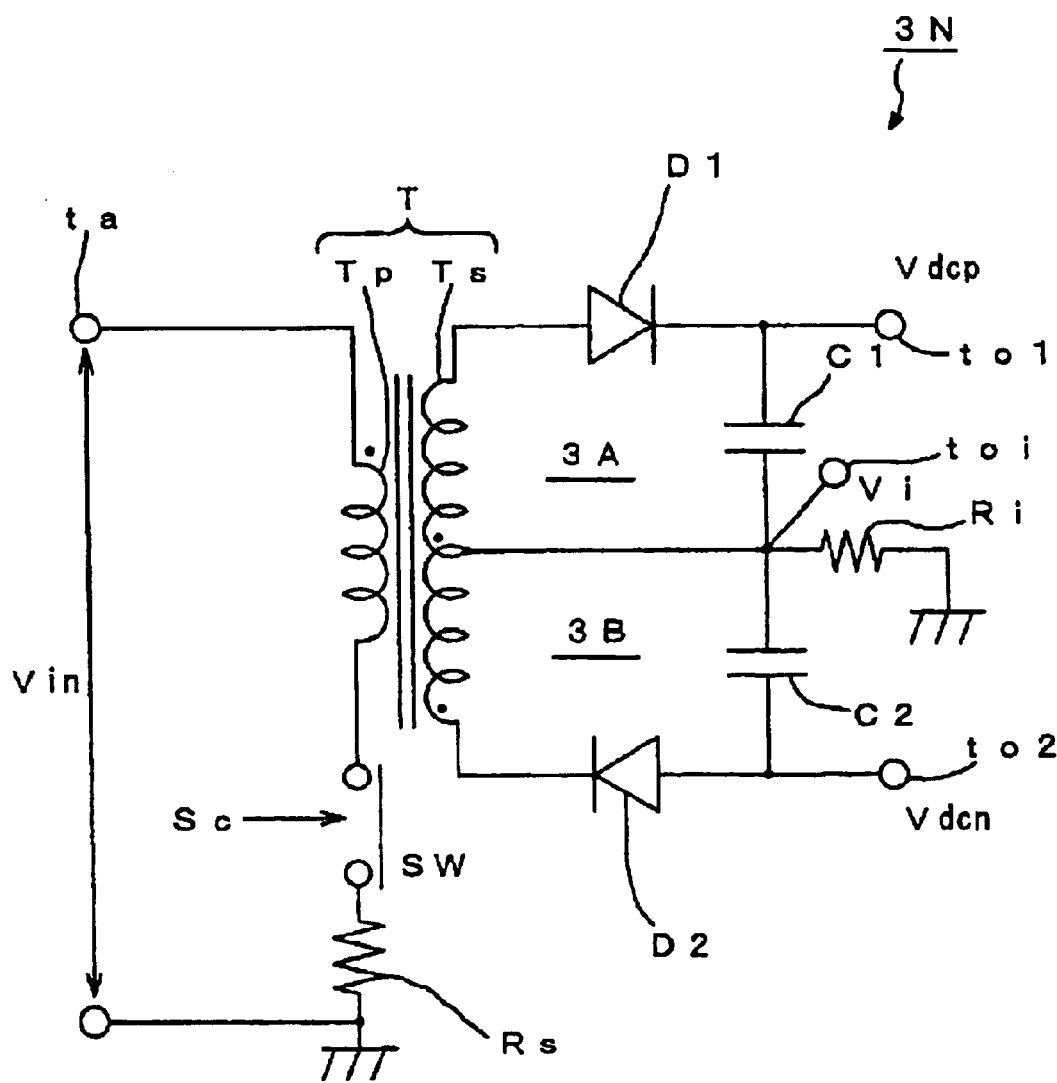
FIG. 2 is a circuit diagram to show a circuit configuration example of non-separation type of DC-DC conversion circuit.
Figure 3:
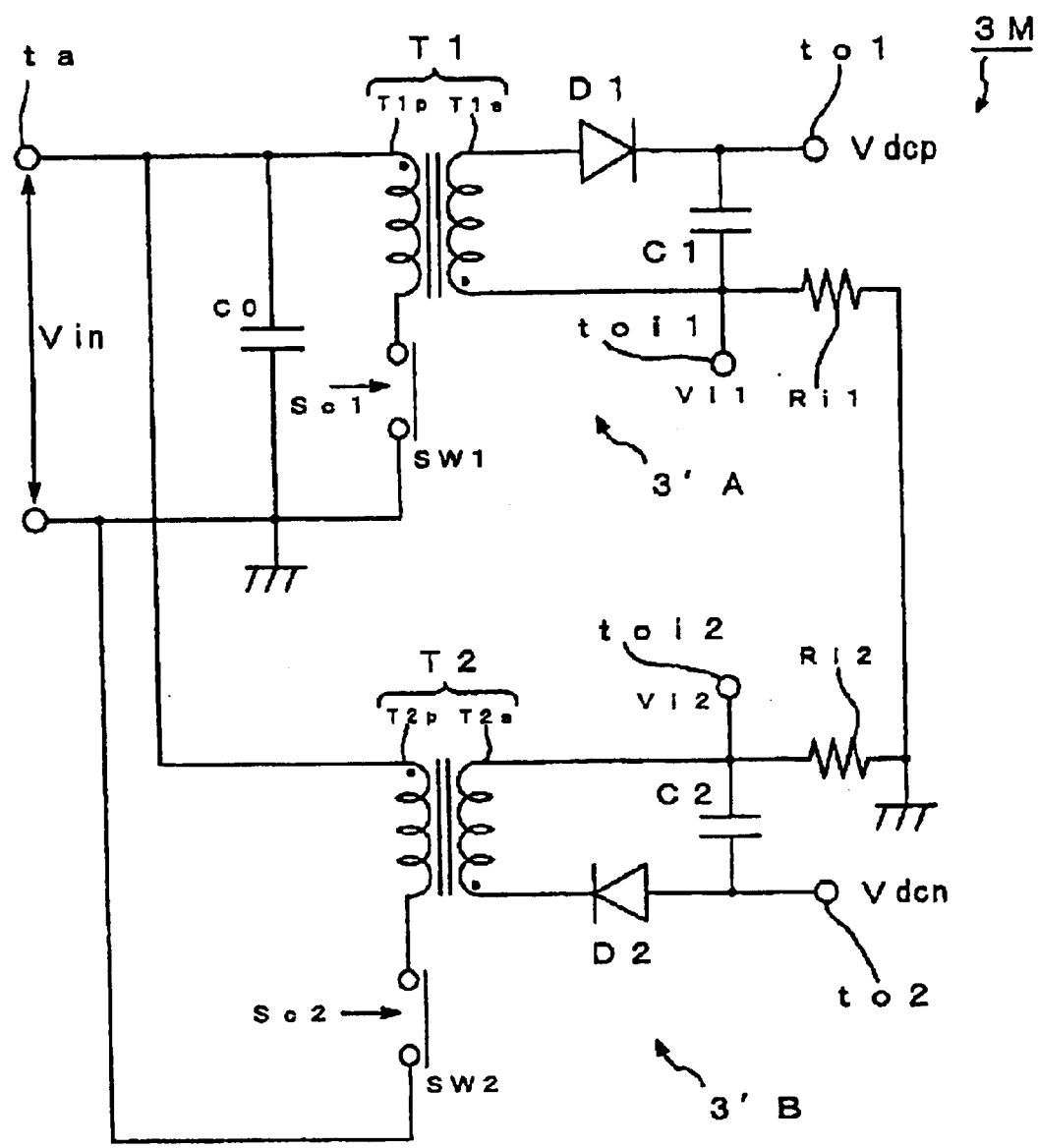
FIG. 3 is a circuit diagram to show a circuit configuration example of separation type of DC-DC conversion circuit.

FIGS. 2 and 3 show configuration examples of the DC-DC conversion circuit. The configuration in FIG. 2 has two circuits 3A and 3B on the secondary side and the configuration in FIG. 3 has circuits 3'A and 3'B on the primary and secondary sides.

FIG. 2 shows a non-separation-type configuration example 3N. A primary winding Tp of a transformer T is connected at one end to a DC input terminal ta, whereby the voltage Vin is input. The primary winding Tp is grounded at an opposite end via a semiconductor switch element SW (simply indicated by a switch symbol in the figure; a field-effect transistor, etc., is used) and a current detection resistor Rs, which is arbitrary and need not necessarily be provided. A signal Sc from the control circuit 7 (see FIG. 1) is supplied to a control terminal of the semiconductor switching element SW (a gate if the switching element SW is an FET) for performing switching control of the semiconductor switching element SW.

A secondary winding Ts of the transformer T is connected at one end to an anode of a diode D1 and a cathode of the diode D1 is connected to one end of a capacitor C1 and is connected to a terminal to1 from which an output voltage (Vdcp) is provided. An opposite end of the capacitor C1 is connected to an intermediate tap of the secondary winding Ts and is grounded via a resistor Ri.

The secondary winding Ts is connected at an opposite end to a cathode of a diode D2 and an anode of the diode D2 is connected to a capacitor C2 and a terminal to2 through which an output voltage (Vdcn) is provided.

The resistor Ri is a current detection element for providing a detection signal (equivalent signal) concerning the current flowing into the discharge lamp 6; the current flowing into the resistor Ri is converted into a voltage, whereby the current is detected. A detection terminal toi is connected to the connection point of the resistor Ri and the capacitors C1 and C2 and a detection signal is provided from the terminal.

As described above, in the configuration example 3N, the positive voltage Vdcp and the negative voltage Vdcn are output from the two output terminals to1 and to2 separately.

The "." mark added to each winding of the transformer T denotes the winding start; for example, as for the secondary winding Ts, the "." mark is added to each of the connection end to the diode D2 and the winding start end at the intermediate tap.

FIG. 3 shows an example of the separation-type configuration. The configuration example 3M has two transformers T1 (primary winding T1p and secondary winding T1s) and T2 (primary winding T2p and secondary winding T2s).

The primary winding T1p, T2p of each transformer is connected at one terminal to a DC input terminal ta and is grounded at an opposite end via a switching element SW1, SW2 (simply indicated by a switch symbol in the figure although a semiconductor switching element such as an FET is used as SW1, SW2). The switching elements SW1 and SW2 are on/off controlled separately by control signals Sc1 and Sc2 from the control circuit 7, whereby each secondary output can be variable-controlled independently.

A capacitor C0 placed in parallel with the primary windings T1p and T2p is connected at one end to the DC input terminal ta and is grounded at an opposite end.

The circuit 3'A comprises the transformer T1, the switching element SW1, and a rectification diode D1, a smoothing capacitor C1, and a current detection resistor Ri1 connected to the secondary winding T1s. That is, the secondary winding T1s is connected at one end to an anode of the diode D1 and a cathode of the diode D1 is connected to an output terminal to1 and is connected to one end of the capacitor C1. The capacitor C1 is connected at an opposite end to a winding start end terminal of the secondary winding T1s and is grounded via the current detection resistor Ri1.

Thus, in the circuit, on/off control of the switching element SW1 is performed based on the control signal Sc1, whereby the current flowing into the primary winding T1p of the transformer T1 is controlled and positive voltage Vdcp is provided at the output terminal to1 via the diode D1 and the capacitor C1 from the secondary winding T1s. A terminal Toi1 is a current detection terminal connected to the connection point of the capacitor C1 and the current detection resistor Ri1 and a detection signal Vi1 is provided from the terminal.

On the other hand, the circuit 3'B comprises the transformer T2, the switching element SW2, and a rectification diode D2, a smoothing capacitor C2, and a current detection resistor Ri2 connected to the secondary winding T2s. That is, the secondary winding T2s is connected at one end (winding start end terminal) to a cathode of the diode D2 and an anode of the diode D2 is connected to an output terminal to2 and is connected to one end of the capacitor C2. The capacitor C2 is connected at an opposite end to a winding termination terminal of the secondary winding T2s and is grounded via the current detection resistor Ri2.

Thus, in the circuit, on/off control of the switching element SW2 is performed based on the control signal Sc2, whereby the current flowing into the primary winding T2p of the transformer T2 is controlled and negative voltage Vdcn is provided at the output terminal to2 via the diode D2 and the capacitor C2 from the secondary winding T2s. A terminal Toi2 is a current detection terminal connected to the connection point of the capacitor C2 and the current detection resistor Ri2 and a detection signal Vi2 is provided from the terminal.

The DC-AC conversion circuit 4 (see FIG. 1) placed at the stage following the DC-DC conversion circuit 3 is provided for converting the output voltage of the DC-DC conversion circuit 3 into an AC voltage and then supplying the AC voltage to the discharge lamps 6L and 6R through the starter circuits 5L and 5R. The positive and negative voltages output from the two output terminals of the DC-DC conversion circuit 3 are sent to the DC-AC conversion circuit 4.

Figure 4:
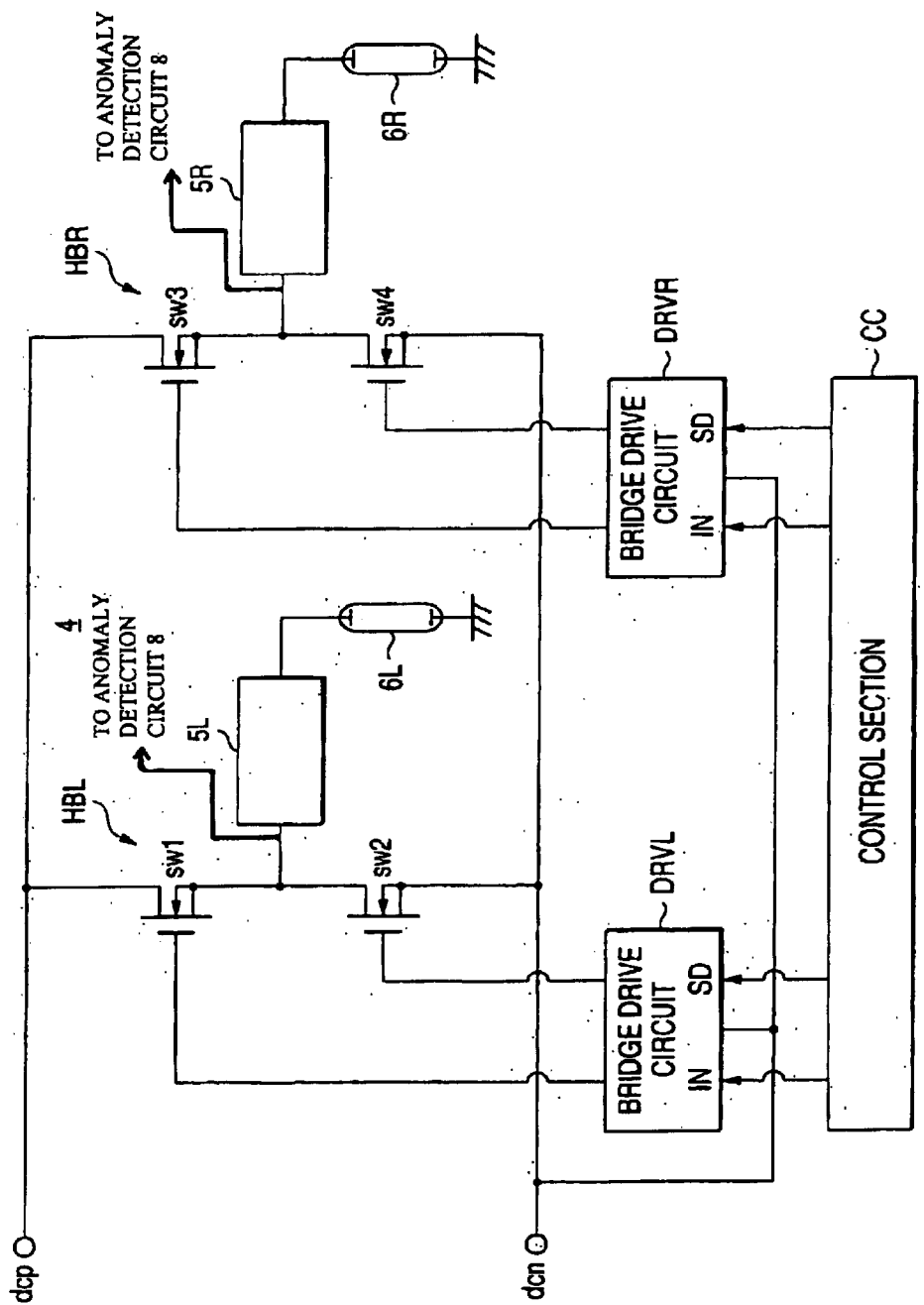
FIG. 4 is a diagram to show the main part of a basic configuration example of a DC-AC conversion circuit.

FIG. 4 shows the main part of a basic configuration example of the DC-AC conversion circuit 4. The DC-AC conversion circuit 4 has half bridges HBL and HBR for receiving the positive voltage Vdcp an the negative voltage Vdcn from the DC-DC conversion circuit 3 and outputting positive or negative voltage.

That is, if it is considered that the two half bridges make up a full bridge, the half bridge HBL forms a left arm and the half bridge HBR forms a right arm. Each half bridge is made up of a pair of semiconductor switching elements, such as field-effect transistors, to switch the output voltages Vdcp and Vdcn. In the figure, the half bridge HBL is made up of semiconductor switching elements sw1 and sw2 and the connection point of both the elements is connected through the starter circuit 5L to the discharge lamp 6L. The half bridge HBR is made up of semiconductor switching elements sw3 and sw4 and the connection point of both the elements is connected through the starter circuit 5R to the discharge lamp 6R. In the figure, each of the discharge lamps 6L and 6R is grounded at one end, but may be grounded via a current detection resistor.

The semiconductor switching elements are alternately operated by bridge drive circuits DRVL and DRVR and AC voltages generated as a result are supplied to the discharge lamps 6L and 6R. That is, as for the switching elements sw1 and sw2, a signal is sent from the bridge drive circuit DRVL to control terminals of the switching elements (gates if the switching elements are FETs), whereby on/off control is performed reciprocally. As for the switching elements sw3 and sw4, a signal is sent from the bridge drive circuit DRVR to control terminals of the switching elements (gates if the switching elements are FETs), whereby on/off control is performed reciprocally. As for each bridge drive circuit, a known IC (integrated circuit) is used as half bridge driver. For example, it has a control input terminal IN for receiving a signal from a control section CC and a terminal SD for receiving a shutdown signal (signal for turning off both the two switching elements making up the half bridge) from the control section CC.

The input voltages to the half bridges are Vdcp and Vdcn described above. For example, to maintain only one discharge lamp 6R on, the shutdown signal may be supplied from the control section CC to the SD terminal of the bridge drive circuit DRVL for turning off both the elements sw1 and sw2 making up the half bridge HBL, and the elements sw3 and sw4 making up the half bridge HBR may be alternately turned on/off for supplying alternation output to the discharge lamp 6R. (However, when the discharge lamp is started, namely, to apply a high-voltage pulse generated by the starter circuit to the discharge lamp, a time period during which the voltage polarity is temporarily fixed is provided. Except for the time, however, basically alternation output is supplied to the discharge lamp and, for example, when the element sw3 is on and the element sw4 is off, the positive voltage Vdcp is supplied to the discharge lamp 6R and when the element sw3 is off and the element sw4 is on, the negative voltage Vdcn is supplied to the discharge lamp 6R.)

To light two discharge lamps, a signal is sent from the control section CC to the IN terminals of the bridge drive circuits DRVL and DRVR so that the half bridges operate in opposite phase (namely, the output polarities of the half bridges are opposite to each other). For example, at the timing at which positive output is supplied to one discharge lamp 6R (sw3 is on and sw4 is off), the on/off state of the elements (sw1 is off and sw2 is on) is controlled so that negative output is supplied to the other discharge lamp 6L. Thus, the half bridges HBR and HBL are driven in opposite phase by the signals supplied from the bridge drive circuits to the control terminals of the switching elements and for the components of the same half bridges, the half bridge alternation operation is performed with the reciprocal relationship, whereby DC voltage is converted into AC voltage.

In the example, the configuration of sending the shutdown signal to the SD terminal of each bridge drive circuit for turning off both the components of the half bridge is adopted, but the invention is not limited to it. For example, each bridge drive circuit may be provided with two IN terminals (IN1 and IN2) and a control signal to the IN1 terminal may define the on/off state of sw1 (or sw3) and a control signal to the IN2 terminal may define the on/off state of sw2 (or sw4). That is, in this case, the state of each of the components of each half bridge can be controlled separately by the control signals to the IN terminals IN1 and IN2 and a predetermined signal (for example, low signal) can be given to the IN1 terminal and the IN2 terminal, thereby turning off both the elements making up the half bride for shutting down the half bridge.

In any way, as for power control to each discharge lamp, to output Vdcp to the first discharge lamp and Vdcn to the second discharge lamp, the converter (or circuit section) for outputting Vdcp controls the first discharge lamp and the converter (or circuit section) for outputting Vdcn controls the second discharge lamp. In contrast, to output Vdcp to the second discharge lamp and Vdcn to the first discharge lamp, the converter (or circuit section) for outputting Vdcp controls the second discharge lamp and the converter (or circuit section) for outputting Vdcn controls the first discharge lamp. The bridges (half bridges HBL and HBR) and the bridge drive circuits (DRVL and DRVR) can be thus used to perform lighting control for the two discharge lamps, so that the circuit configuration can be simplified and the costs, the number of parts, etc., can be decreased.

The starter circuit 5L, 5R (see FIGS. 1 and 4) is provided for generating a high-voltage pulse signal (starter pulse) for starting the corresponding discharge lamp and the signal is superposed on AC voltage output by the DC-AC conversion circuit 4 and is applied to the corresponding discharge lamp.

In the figure, the starter circuits are provided in a one-to-one correspondence with the discharge lamps, but the primary winding of the transformer placed in the starter circuit may be made command and the high-voltage pulse signal for starting may be supplied to each discharge lamp separately through a plurality of secondary windings.

As detection circuit for detecting the current flowing into each discharge lamp, for example, current detection circuit for detecting the value of the current flowing into the discharge lamp using the current detection resistors Ri, Ri1, and Ri2 mentioned above is provided. As for voltage detection circuit for detecting the voltage related to each discharge lamp, for example, an output voltage detection circuit using a voltage dividing resistor, etc., as known can be provided for providing a detection signal of output voltage (Vdcp, Vdcn).

The control circuit 7 (see FIG. 1) receives a detection signal of the voltage related to the discharge lamp and a detection signal of the current flowing into the discharge lamp and controls the power input to the discharge lamp and output of the DC-DC conversion circuit 3. That is, the control circuit 7 is provided for controlling supply power responsive to the discharge lamp state and sends a control signal to the DC-DC conversion circuit 3, thereby controlling the output voltage of the circuit. The control circuit 7 also sends a control signal to the bridge drive circuit (DRVL, DRVR) for controlling bridge polarity switching (namely, the control circuit 7 comprises the function of the control section CC shown in FIG. 4). Before the discharge lamp is lit, the control circuit 7 also performs output control to ensure lighting of the discharge lamp by raising the supply voltage to the discharge lamp to one level. PWM (pulse width modulation) system, PFM (pulse frequency modulation) system, etc., is known as power control system.

By the way, in the control of the two discharge lamps described above, it is not guaranteed that the switching elements making up each half bridge always operate normally. If any switching element fails as an arc surge, etc., occurs, anomaly detection and protection measures are required.

Assume the case where the lighting circuit for lighting one discharge lamp has a full-bridge-type circuit, for example, the configuration wherein the discharge lamp 6R and the starter circuit SR are not included and the discharge lamp 6L is not grounded at one end and connected to the connection point of the elements sw3 and sw4 making up the half bridge HBR in the configuration in FIG. 4 (however, assume that positive or negative supply voltage Vdc is supplied to the element sw1, sw3 and that one end not connected to the starter circuit or the discharge lamp, of non-control terminals of the element sw2, sw4 is connected to the ground line). At this time, assume that a field-effect transistor is used as each switching element and that a failure occurs in the element sw3 of the right arm (HBR) (short-circuit destruction between drain and source). At the timing at which the element sw4 is turned on, the output stage of the DC-DC conversion circuit enters a through stage and the supply voltage Vdc lowers rapidly. Thus, in this state, the voltage is compared with a predetermined reference voltage, whereby an anomaly can be detected. While the cause of the switching element failure is troubleshot, a signal (shutdown signal) for turning off all elements is generated and is sent to the bridge drive circuit regardless of whether or not the discharge lamp is lit, whereby expansion of damage can be prevented. At this time, all elements may be turned off regardless of whether the failing switching element is a component of the right arm (HBR) of the bridge or a component of the left arm (HBL); this is simple.

However, to perform lighting control of two discharge lamps using the full-bridge configuration of HBL and HBR as described above, the same concept as that for one discharge lamp cannot be followed for the following reasons (A) to (C):

(A) It is necessary to determine which half bridge the failing component is contained in.

(B) If both components of the half bridge are simply turned off, protection measures may be insufficient.

(C) To light the discharge lamp corresponding to the half bridge containing no element failure, the discharge lamp needs to be reliably able to be started.

To begin with, as for (A), if any of the elements making up one half bridge (for example, the right arm) fails, it is necessary to normally operate the other half bridge (left arm), whereby lighting the discharge lamp connected to the half bridge is guaranteed. That is, it is impossible to turn off all four switching elements as in the case of one discharge lamp. Therefore, if an anomaly is detected about an element failure, it is desirable that which half bridge the failing switching element is contained in should be determined correctly and that protection measures should be taken for the failing bridge and the bridge containing no failure should be operated normally.

Figure 5:
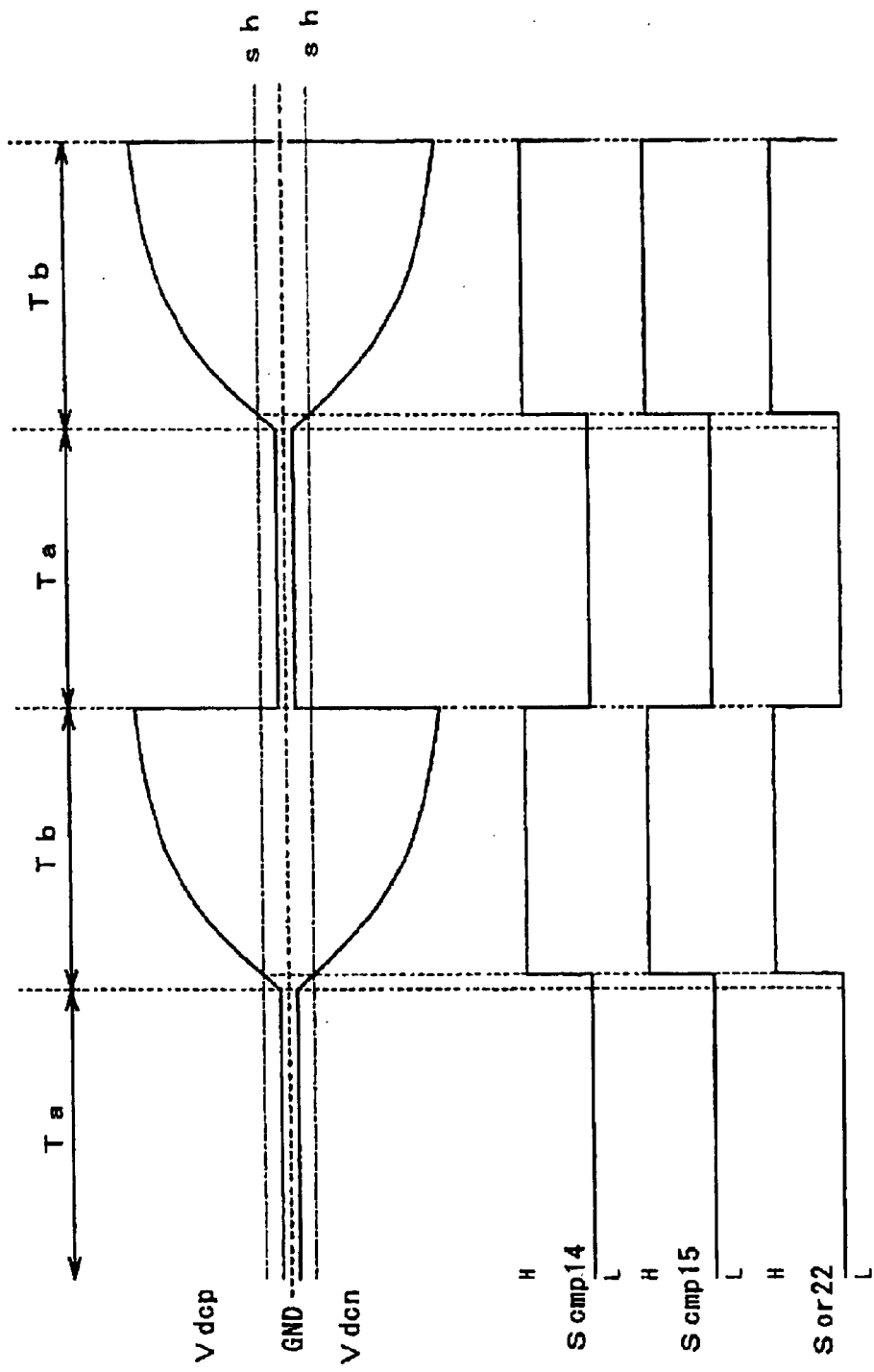
FIG. 5 is a drawing to describe a state in which a component sw3 of a right arm fails in lighting two discharge lamps.

FIG. 5 shows a state in which the component sw3 of the right arm (HBR) fails in lighting two discharge lamps. In time period Ta indicated relative to Vdcp and Vdcn, an on command is issued to the component sw1 of the left arm (HBL) and the component sw4 of the right arm (HBR) and in time period Tb, an on command is issued to the component sw3 of the right arm (HBR) and the component sw2 of the left arm (HBL).

As shown in the figure, through occurs in the right arm in the time period Ta and thus both Vdcp and Vdcn lower to voltage close to the ground (GND) potential. A through state does not occur in the time period Tb and the Vdcp and Vdcn voltages rise gradually (for example, under no load, rising toward the output voltage of the converter defined for each (open circuit voltage OCV)). Again the voltages lower in the time period Ta. This sequence is repeated. Therefore, Vdcp and Vdcn or outputs of both the left and right arms are almost the same-level voltages at the same timing and thus it is understood that which half bridge the failing element is contained in cannot be determined simply by making a voltage comparison.

The problem in (B) remains unsolved if the determination problem in (A) is solved and an off command is issued to the component of the half bridge determined to fail.

Figure 6:
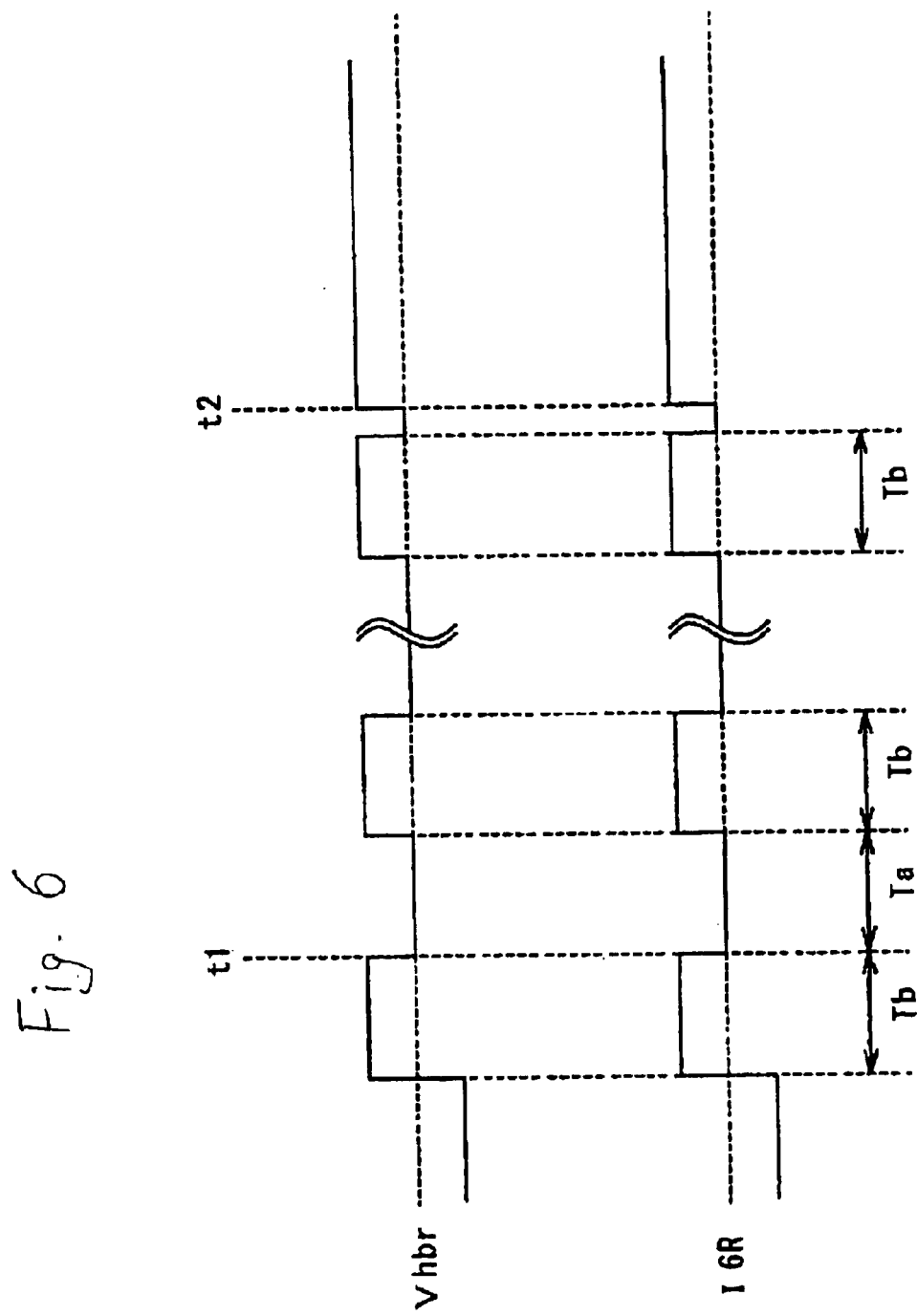
FIG. 6 is a drawing to schematically show the waveforms of output voltage of the right arm and current flowing into the discharge lamp when the right arm fails.

For example, assume that it is determined that a failure occurs in the component sw3 of the right arm, that an off command is issued to the components sw3 and sw4 of the half bridge HBR as protection measures against the failure, and that the discharge lamp 6R is already lit. FIG. 6 schematically shows the waveforms of output voltage Vhbr of the right arm and current I6R flowing into the discharge lamp 6R in such a situation. Ta and Tb shown in the figure are as previously described and timing t1 indicates the failure occurrence time point and timing t2 indicates the failure determination time point.

When a short-circuit failure occurs in the component sw3 of the right arm (HBR) at the timing t1 in normal lighting of the discharge lamp 6R (stable lighting except for the starting time), a through state occurs at the timing at which the element sw4 is turned on, namely, in the time period Ta. Since no through state occurs in the time period Tb, as shown in the figure, the output voltage Vhbr alternates with one polarity and the repetitions are detected as the repetition time or the number of repetitions, whereby it is made possible to determine a failure. If a command for turning off both the components of the right arm is issued at the timing t2, the through state does not occur, but the output voltage of HBR is fixed to Vdcp. The behavior at this time also varies depending on the state of the other discharge lamp 6L; for example, if the discharge lamp is normally lit, Vdcp becomes lighting control voltage of the discharge lamp 6L at the timing at which the switching element sw1 of the left arm is turned on. In the opposite timing, namely, when the switching element sw2 of the left arm is turned on, Vdcp becomes lighting control voltage of the discharge lamp 6R. Consequently, for the discharge lamp 6R connected to the failing arm, DC lighting is maintained through the failing element sw3, thus causing degradation of the discharge lamp and abnormal heating of the switching element.

As for (C), to use a switching element forming the starter circuit, for example, a discharge gap element which self-breaks down, variations in the discharge voltage need to be considered and a situation in which a starter pulse is always generated by the discharge gap element lower in the discharge voltage needs to be circumvented.

It is known that it is preferred to fix the voltage polarity of the bridge to the positive or negative polarity temporarily at the discharge lamp starting time from the viewpoint of stability of lighting. Therefore, to light one of two discharge lamps, the output polarity of the half bridge to which the discharge lamp is connected may be temporarily fixed (for example, to the positive polarity). However, if a switching element failure occurs, for the discharge lamp connected to the normal half bridge, a starter pulse needs to be reliably generated to light the discharge lamp.

For example, as the configuration of the starter circuit, assume that a predetermined supply voltage obtained from the output voltage of the DC-DC converter is received for charging a capacitor and that when the voltage across the capacitor exceeds one threshold value, a starter pulse is generated by discharge gap element and is applied through transformer to the discharge lamp. To light the discharge lamp 6R, in FIG. 4, if the switching element sw3 of the right arm (HBR) is turned on and the left arm (HBL) is shut down or the switching element sw2 is turned on, the output polarity of the HBR can be defined as the positive polarity. Now, assuming that Vdcp becomes one voltage, for example, open circuit voltage 350 V by performing switching control of the DC-DC converter and 700 V is provided as the supply voltage to the starter circuit 5R, the capacitor in the starter circuit 5R can store charges corresponding to 350+700=1050 V at the maximum. On the other hand, the capacitor in the starter circuit 5L can be charged only with up to 700+Vdnc voltage equivalent. Thus, for example, if a discharge gap element which self-breaks down at about 800 V is used, a starter pulse is generated only in the starter circuit 5R and is applied to the discharge lamp 6R.

However, for example, assuming that a short-circuit failure occurs in the switching element sw1 of the left arm (HBL), the failure is detected and determined and the half bridge of the left arm is shut down and when an attempt is made to light the discharge light 6R in this state, an on command is issued to the switching element sw3 of the right arm (HBR) and charging the capacitor in the starter circuit 5R is started. In this case, charging the capacitor in the starter circuit 5L is also started because of the failure of the switching element sw1. That is, a maximum of 1050-V voltage is supplied to both the starter circuits and thus a high-voltage pulse is early generated by the starter circuit having the discharge gap element lower in the discharge voltage (threshold value) because of characteristic variations in the discharge gap elements. If the high-voltage pulse is early generated by the starter circuit 5L although an attempt is made to start the discharge lamp 6R, the discharge lamp 6L not intended for starting may be lit. At this time, the switching elements of the left arm are shut down and thus if the discharge lamp 6L is switched off by polarity inversion of rectangular wave, when an attempt is again made to light, if the terminal voltages of the capacitors in the starter circuits are at similar level, still a starter pulse is early generated by the starter circuit having the discharge gap element lower in the discharge voltage (threshold value).

Thus, a starter pulse must be applied to the intended discharge lamp for reliably lighting the discharge lamp without applying the starter pulse to the discharge lamp not indented for lighting.

The measures against (A) to (C) will be discussed in order. To begin with, the configuration and method for detecting and determining whether or not a switching element failure occurs will be discussed.

An anomaly detection circuit 8 shown in FIG. 1 detects a failure occurring in each switching element of each half bridge. It detects positive and negative output voltages of the DC-DC conversion circuit 3 or the output voltages of the half bridges. When the voltages become lower than a predetermined threshold value at the same timing, it is determined that a switching element failure occurs. When it is determined that a failure occurs, for example, the control state of the DC-DC conversion circuit 3 is changed directly or through the control circuit 7 or the control state of the DC-AC conversion circuit 4 is changed directly or through the control circuit 7. A method of controlling switch means for shutting off power supply to the DC-DC conversion circuit 3 and the later if a failure occurs in one half bridge is not adopted (because it is also made impossible to light the discharge lamp connected to the normal half bridge if the method is adopted. Therefore, if both the half bridges fail, the method may be adopted.)

Figure 7:
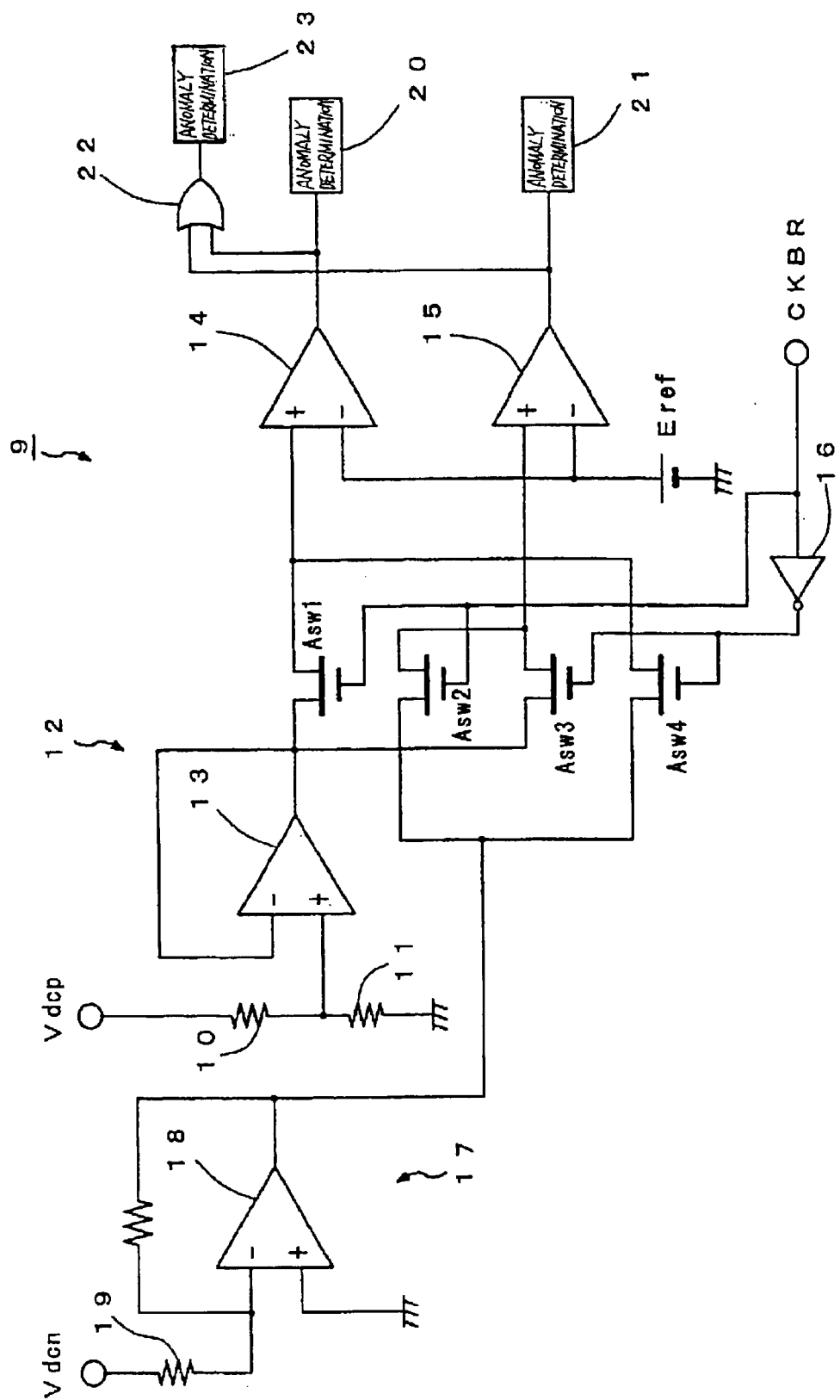
FIG. 7 is a circuit diagram to show a configuration example about anomaly determination as to an element failure.

FIG. 7 shows a configuration example 9 of the anomaly detection circuit. In the example, Vdcp and Vdcn are to be detected.

The output voltage Vdcp of the DC-DC conversion circuit 3 is detected by voltage dividing resistors 10 and 11 and is sent to a noninverting input terminal of an operational amplifier 13 forming a voltage buffer 12.

An output signal of the operational amplifier 13 is supplied through an analog switch Asw1 (indicated by an abbreviated symbol in the figure) to a positive input terminal of a comparator 14 and is supplied through an analog switch Asw3 (indicated by an abbreviated symbol in the figure) to a positive input terminal of a comparator 15. A signal having a predetermined frequency for controlling the component of the half bridge HBL, HBR to provide alternation output, which will be hereinafter referred to as polarity inversion signal (CKBR), is supplied to a control terminal of the analog switch Asw1, thereby defining the on/off state of the element. The polarity inversion signal CKBR is supplied through a NOT (logical NOT) gate 16 to a control terminal of the analog switch Asw3, thereby defining the on/off state of the element.

The output voltage Vdcn of the DC-DC conversion circuit 3 is detected by an operational amplifier 18 forming an inverting amplifier 17 and is supplied via a resistor 19 to an inverting input terminal of the operational amplifier 18. An output signal of the operational amplifier 18 is supplied through an analog switch Asw2 (indicated by an abbreviated symbol in the figure) to a positive input terminal of a comparator 15 and is supplied through an analog switch Asw4 (indicated by an abbreviated symbol in the figure) to a positive input terminal of a comparator 14. The polarity inversion signal CKBR is supplied to a control terminal of the analog switch Asw2, thereby defining the on/off state of the element. The polarity inversion signal CKBR is supplied through the NOT gate 16 to a control terminal of the analog switch Asw4, thereby defining the on/off state of the element.

Reference voltage Eref (indicated by a symbol of a constant voltage source in the figure) is supplied to negative input terminals of the comparators 14 and 15 and output signals of the comparators are sent to anomaly determination sections 20 and 21 following the comparators and are also sent through a 2-input OR (logical OR) gate 22 to an anomaly determination section 23.

The anomaly determination section 20 receives the output signal of the comparator 14 and determines whether or not a short circuit of output load is detected. That is, if the output signal of the comparator 14 remains low over a determination reference time, the anomaly determination section 20 determines that a short-circuit anomaly occurs at the output stage related to the discharge lamp 6R, and sends a signal to a protection circuit (fail-safe circuit) not shown for shutting off power supply to the discharge lamp 6R.

Likewise, the anomaly determination section 21 receives the output signal of the comparator 15 and determines whether or not a short circuit of output load is detected. That is, if the output signal of the comparator 15 remains low over the determination reference time, the anomaly determination section 21 determines that a short-circuit anomaly occurs at the output stage related to the discharge lamp 6L, and sends a signal to a protection circuit (fail-safe circuit) not shown for shutting off power supply to the discharge lamp 6L.

The anomaly determination section 23 receives a signal from the OR gate 22 and determines whether or not a short-circuit failure occurs in any component of the half bridges.

As described above, when a failure occurs in any of the four switching elements making up the half bridges, a through state occurs concerning Vdcp and Vdcn at one timing and Vdcp and Vdcn lower close to zero volts at this time (the voltage of the discharge lamp lowers to such an extent that it is impossible in normal lighting, and becomes close to 0 V).

If a short-circuit failure occurs in the component sw3 of the right arm, for example, as shown in FIG. 5, abnormal lowering of voltage occurs in the time period Ta in which the elements sw1 and sw4 are turned on.

The symbols shown in the figure have the following meanings:
  sh: Threshold value corresponding to reference voltage Eref
  Scmp14: Output signal of comparator 14
  Scmp15: Output signal of comparator 15
  Sor22: Output signal of OR gate 22
  In the figure, H denotes high and L denotes low.

The difference from the short-circuit state of output load described above lies in that Vdcp and Vdcn lower close to 0 V at the same timing. That is, in the short-circuit state of output load, the detection voltage of Vdcp or Vdcn continues in a state lower than the predetermined reference voltage and thus when this state continues for the given time or more, an anomaly is detected; to make an anomaly determination as to a short-circuit failure of a switching element, the voltage rises or lowers depending on the bridge polarity. Therefore, in the latter state, anomaly determination as to short-circuit state of load is not made. In other words, for the anomaly determination as to a switching element failure, the state in which the detection voltage of Vdcp or Vdcn is lower than the predetermined reference voltage and the state in which the detection voltage of Vdcp or Vdcn is higher than the predetermined reference voltage are repeated in response to the bridge polarity and in the figure, this fact is detected by the comparators 14 and 15 and if the output signal Sor22 of the OR gate 22 goes low, it is determined that an anomaly occurs. That is, if both the positive and negative output voltages become lower than predetermined threshold value, both the output signals of the comparators 14 and 15 go low and the OR gate 22 outputs a low signal. Accordingly, it is determined that a failure occurs in one of the switching elements making up the half bridge.

It is too early to determine that an element failure occurs as an abnormal state related to the detected voltage is detected only once and therefore preferably from the viewpoint of reliability of determination, it is determined that an element failure occurs if the abnormal state continues over a predetermined determination reference time or a predetermined number of times. Thus, the anomaly determination section is provided with a timer for measuring the duration of an abnormal condition, a counter, a delay circuit, etc., (see FIG. 9).

Next, switching element failure determination will be discussed separately according to the following cases:
  (1) Where an anomaly is detected when only either of two discharge lamps is lit; and
  (2) where an anomaly is detected when two discharge lamps are lit.

To begin with, in (1), one discharge lamp is lit and the half bridge corresponding to the other discharge lamp is shut down. Therefore, an abnormal state (namely, an abnormal lowering state of detected voltage) about a half bridge component failure is detected for the half bridge corresponding to the lit discharge lamp. At the time, preferably whether or not a failure occurs is determined by the fact that the abnormal state continues over a predetermined determination reference time (first reference time), for example, and both the components of the half bridge determined to fail based on the determination result are defined so that they are turned off, whereby expansion of damage can be prevented. To do this, a shutdown signal may be supplied to the SD terminal of the bridge drive circuit of the corresponding half bridge in the example in FIG. 4 (for example, if the shutdown signal is defined to be high, a command for turning off both the components of the half bridge is issued).

In (2), when two discharge lamps are lit, which half bridge the failing component is contained in needs to be determined. That is, this corresponds to (A) described above and as the output signal Sor22 of the OR gate 22 is only obtained in FIG. 7, the failing half bridge cannot be located. Then, if an abnormal state is detected about a bridge failure, an attempt is made to shut down one half bridge for stopping the operation of the elements thereof for inspection. If the abnormal state continues still after the operation of the elements is stopped, it is determined that the half bridge with the abnormal state maintained (namely, the other half bridge) fails, and protection measures are taken.

The processing procedure is stated by item as in (a) to (g):
  (a) When two discharge lamps are lit, an abnormal state about a component failure of half bridge is detected;
  (b) both the components of the first half bridge to which one discharge lamp is connected are defined temporarily so that they are turned off;
  (c) whether or not the abnormal state continues still in (b) is checked;

(d) when the abnormal state continues for the first reference time, it is determined that the second half bridge fails, and both the components of the second half bridge are defined so that they are turned off;

(e) if the abnormal state does not continue in (c), the temporary definition (shutdown) in (b) is stopped and then both the components of the second half bridge are defined temporarily so that they are turned off;

(f) whether or not the abnormal state again occurs in (e) is checked; and (g) if the abnormal state again occurs, when the abnormal state continues for the first reference time, it is determined that the first half bridge fails, and both the components of the first half bridge are defined so that they are turned off.

Taking the case where the component sw3 of the right arm (HBR) fails as an example, first an abnormal state is detected in (a) and thus if the half bridge HBR is shut down in (b), it is determined that the abnormal state does not continue in (c). Therefore, if the half bridge HBL is shutdown in (e), the abnormal state again occurs in (f) and thus the duration of the abnormal state is compared with the first determination reference time. As a result, it is determined that HBR fails, and an off command is issued to sw3 and sw4 (shutdown). That is, in this case, the first half bridge is HBR.

If the left arm (HBL) is selected as the first half bridge in (b), the abnormal state continues in (c) and the duration of the abnormal state is compared with the first determination reference time in (d). As a result, it is determined that the second half bridge (HBR) fails, and an off command is issued to sw3 and sw4 (shutdown).

Figure 8:
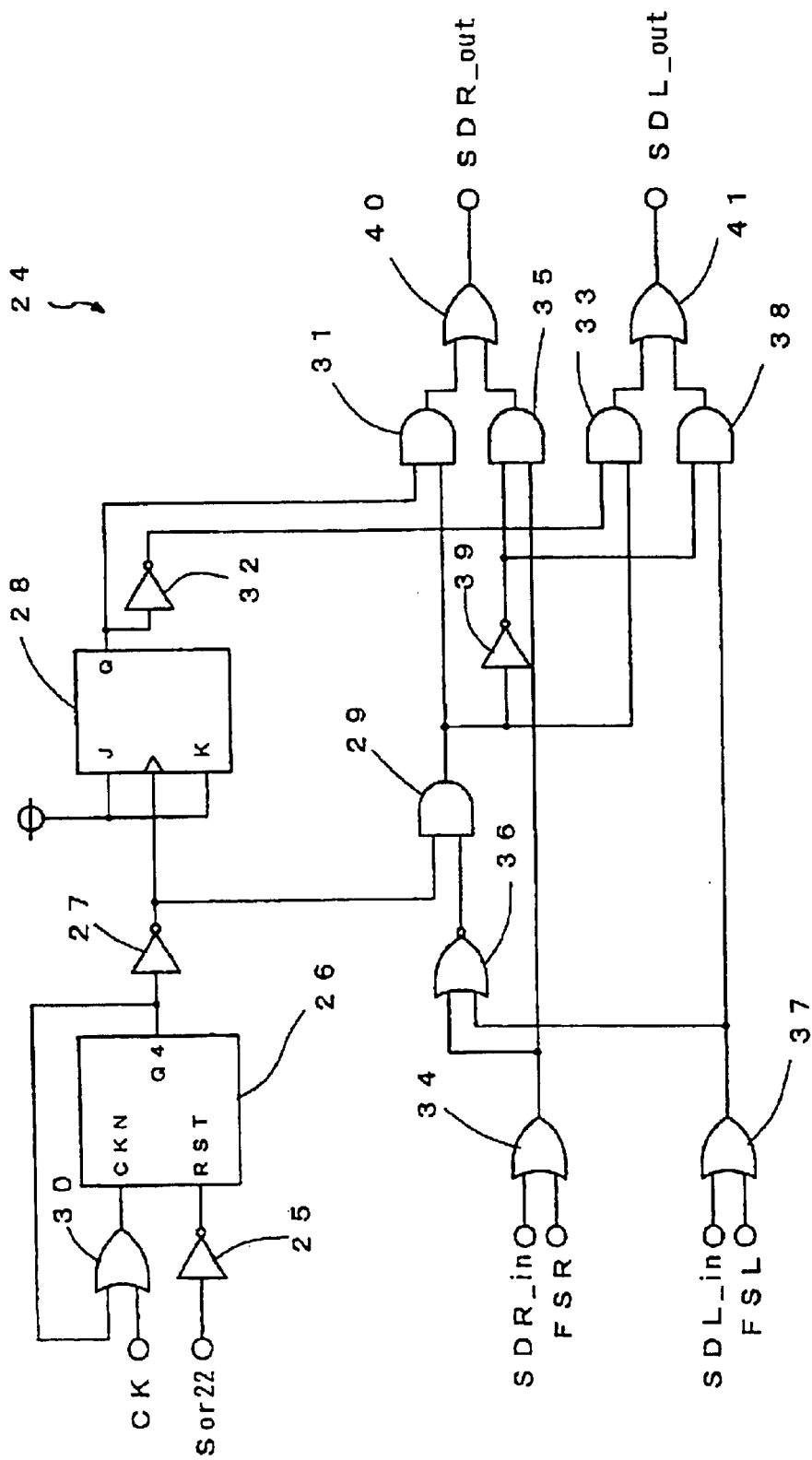
FIG. 8 is a diagram to show the main part of a circuit configuration example related to failure determination of half bridge.

FIG. 8 shows an example 24 of the main part of the circuit configuration. The symbols shown in the figure have the following meanings:

CK: Reference clock signal

SDR_in: Command signal for shutting down half bridge HBR so as not to light discharge lamp 6R SDL_in: Command signal for shutting down half bridge HBL so as not to light discharge lamp 6L FSR: Signal for anomaly determination as to discharge lamp 6R (containing anomaly determination of switching element failure) and circuit protection FSL: Signal for anomaly determination as to discharge lamp 6L (containing anomaly determination of switching element failure) and circuit protection SDR_out: Output signal for shutting down half bridge HBR SDL_out: Output signal for shutting down half bridge HBL SDR_in or SDL_in is a signal for shutting down the half bridge connected to the discharge lamp to be unlit; when the signal is high, the corresponding half bridge is shut down. FSR or FSL is a signal which goes high if it is determined that an anomaly (for example, short circuit of load, output open, abnormal lowering of output voltage, anomaly of output current, etc.,) about the discharge lamp or the lighting circuit occurs. The signal SDR_out is sent to the SD terminal of the bridge drive circuit DRVR shown in FIG. 4 and the signal SDL_out is sent to the SD terminal of the bridge drive circuit DRVL. When the signal SDR_out or SDL_out is high, both the components of the corresponding half bridge are turned off for shutting down the half bridge.

As for the circuit configuration, the signal Sor22 related to bridge element failure detection (output signal of the OR gate 22 in FIG. 7) is supplied through a NOT gate 25 to a reset terminal (RST) of a counter 26.

A signal provided from an output terminal (Q4) at a predetermined level in the counter 26 is sent through a NOT gate 27 to a clock signal input terminal of a JK flip-flop 28 and one input terminal of a 2-input AND gate 29. The signal of the output terminal (Q4) is also sent to a 2-input OR gate 30 for ORing the signal and a clock signal CK. Then, the ORing result is supplied to a clock signal input terminal (CKN) of the counter 26.

In the JK flip-flop 28, a high signal is supplied to J and K terminals (T flip-flop) and a signal provided from a Q terminal (Q output) is sent to one input terminal of a 2-input AND (logical AND) gate 31 and is also sent through a NOT gate 32 to one input terminal of a 2-input AND gate 33.

The signals SDR_in and FSR are sent to a 2-input OR gate 34 and an output signal of the OR gate 34 is sent to a 2-input AND gate 35 and a 2-input NOR (non-disjunction) gate 36.

The signals SDL_in and FSL are sent to a 2-input OR gate 37 and an output signal of the OR gate 37 is sent to a 2-input AND gate 38 and the 2-input NOR gate 36.

An output signal of the NOR gate 36 is sent to the 2-input AND gate 29 for ANDing the output signal and a signal from the NOT gate 27. Then, the output signal of the AND gate 29 is sent to the AND gates 31 and 33 and is also sent through a NOT gate 39 to the AND gates 35 and 38.

The AND gate 31 ANDs the output signal of the AND gate 29 and the Q output of the JK flip-flop 28 and sends the result to one input terminal of a 2-input OR gate 40.

The AND gate 35 ANDs the output signal of the NOT gate 39 and the output signal of the OR gate 34 and sends the result to the other input terminal of the 2-input OR gate 40.

The AND gate 33 ANDs the output signal of the AND gate 29 and the output signal of the NOT gate 32 and sends the result to one input terminal of a 2-input OR gate 41.

The AND gate 38 ANDs the output signal of the NOT gate 39 and the output signal of the OR gate 37 and sends the result to the other input terminal of the 2-input OR gate 41.

The output signal of the OR gate 40 becomes SDR_out and the output signal of the OR gate 41 becomes SDL_out. The signals are sent to the bridge drive circuits (not shown).

In the circuit, when Sor22 is high (when no element failure occurs), output of the counter 26 (Q4) goes high in a predetermined time (for example, about 4 milliseconds if the frequency of the signal CK is 2 kHz). Therefore, the low signal output by the NOT gate 27 is sent through the AND gate 29 to the NOT gate 39 for negating the signal. Then, the high signal output by the NOT gate 39 is sent to the AND gates 35 and 38. Thus, the signal becomes SDR_out intact if the signal SDR_in or FSR is high; likewise, the signal becomes SDL_out intact if the signal SDL_in or FSL is high.

When Sor22 goes low, the counter 26 is reset by the high signal output by the NOT gate 25, and the Q4 output goes low.

As shown in FIG. 5, if Sor22 repeatedly goes high and low when an element failure occurs, only if output of the counter 26 is low and inputs of the OR gates 34 and 37 are low, SDR_out and SDL_out are defined by output of the JK flip-flop 28 and when one is high, the other goes low.

For example, assume that the Q output of the JK flip-flop 28 is high when the right arm (HBR) fails. When both outputs of the OR gates 34 and 37 are low, the high signal output by the NOR gate 36 and the high signal output by the NOT gate 27 are sent through the AND gate 29 to the AND gate 31. Thus, the high signal output by the AND gate 31 becomes SDR_out (HBR is shut down) through the OR gate 40. On the other hand, the output signals of the AND gates 33 and 38 are low and therefore SDL_out goes low.

That is, in this case, HBR is selected and is shut down. Thus, Sor22 goes high (namely, the abnormal state of the element failure is not detected), and the Q4 output of the counter 26 once goes high. Accordingly, the output signals of the AND gates 29 and 31 go low and SDR_out is low and thus shutting down of HBR is released.

Then, again Sor22 repeatedly goes high and low, abnormal state is detected, the Q4 output of the counter 26 goes low, and the output signal of the NOT gate 27 makes the low to high transition. Thus, the JK flip-flop 2B is inverted and the Q output goes low. Consequently, the high signal output by the AND gate 33 becomes SDL_out through the OR gate 41 and thus the left arm (HBL) is shut down.

Since the right arm (HBR) is not shutdown, Sor22 repeatedly goes high and lowand the state is maintained. If it is determined by the anomaly determination section 23 that the state is maintained over the determination reference time, for example, it is determined that the half bridge not shutdown (in the example, HBR) fails. The determination result is supplied to the OR gate 34 as the high signal of FSR and the high signal is supplied from the AND gate 29 through the NOT gate 39 to the AND gate 35. Thus, the high signal output by the AND gate 35 becomes SDR_out. Consequently, the failing HBR is shut down and protection measures are taken.

If the Q output of the JK flip-flop 28 is low in the beginning, SDL_out goes high and HBL is temporarily shut down, but Sor22 still repeatedly goes high and low and thus the Q output of the counter 26 is low. When FSR goes high as a result of comparing the duration of the state with the determination reference time, the failing HBR is shut down in a similar manner to that described above.

According to the circuit, the case in (1) described above is also covered completely. For example, when the discharge lamp 6R is lit and the HBL corresponding to the discharge lamp 6L is shut down, SDR_out is output low and SDL_out is output high. If the right arm HBR fails, the signal Sor22 repeatedly goes high and low and this state is maintained. Thus, if the duration of the state exceeds the predetermined reference time, it is determined that HBR fails, and HBR is shut down.

Figure 9:
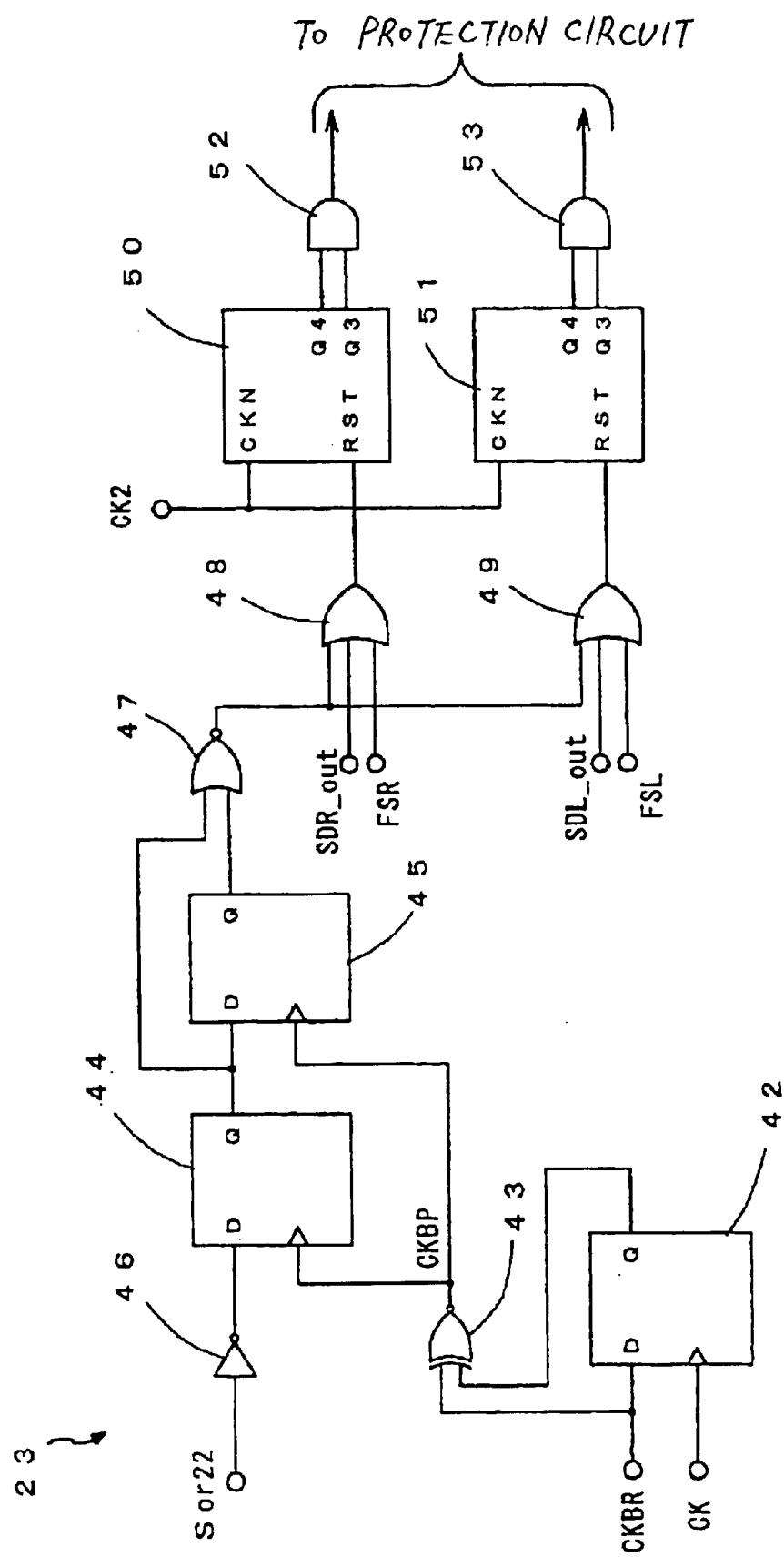
FIG. 9 is a circuit diagram to show a configuration example of an anomaly determination section.

FIG. 9 shows a circuit configuration example of the anomaly determination section 23.

The polarity inversion signal CKBR is supplied to a D terminal of a D flip-flop 42 and one input terminal of a 2-input Ex-NOR (exclusive NOR) gate 43 and a clock signal CK from a signal generation section (not shown) is sent to a clock signal input terminal of the D flip-flop 42.

An output signal of the Ex-NOR gate 43 is a signal generated like a pulse at the timing at which the bridge polarity is inverted, which will be hereinafter referred to as polarity inversion pulse signal (CKBP), and is sent to clock signal input terminals of D flip-flops 44 and 45.

Sor22 is supplied through a NOT gate 46 to a D terminal of the D flip-flop 44. Q output is sent to a D terminal of the D flip-flop 45 following the D flip-flop 44 and a NOR (non-disjunction) gate 47.

A Q output signal of the D flip-flop 45 is sent to the NOR gate 47 and an output signal of the gate 47 is sent to 3-input OR gates 48 and 49.

In addition to the output signal of the NOR gate 47, SDR_out and FSR are input to the 3-input OR gate 48 and an output signal of the OR gate 48 is supplied to a reset terminal (RST) of a counter 50.

In addition to the output signal of the NOR gate 47, SDL_out and FSL are input to the 3-input OR gate 49 and an output signal of the OR gate 49 is supplied to a reset terminal (RST) of a counter 51.

A clock signal CK2 having a predetermined frequency is supplied to clock signal input terminals (CKN) of the counters 50 and 51 and Q3 output and Q4 output of one counter 50 are sent to a 2-input AND gate 52. Q3 output and Q4 output of the other counter 51 are sent to a 2-input AND gate 53.

Output signals of the AND gates 52 and 53 are sent to a protection circuit (fail-safe circuit) not shown.

As for the frequencies of the reference signals, for example, CKBR is 500 Hz, CK is 2 kHz, and CK2 is 250 Hz.

In the circuit, Sor22 is sampled in the D flip-flops 44 and 45 by the polarity inversion pulse signal CKBP and only if a high signal is not obtained two successive times, the NOR gate 47 outputs a high signal. That is, when an element failure occurs, the NOR gate 47 outputs a low signal.

The 3-input OR gates 48 and 49 are provided for discriminating between HBR and the discharge lamp 6R and HBL and the discharge lamp 6L. When the OR gate 48 outputs a high signal, the counter 50 does not perform the counting operation. Likewise, when the OR gate 49 outputs a high signal, the counter 51 does not perform the counting operation.

Therefore, when SDR_in and FSR are low, if the NOR gate 47 outputs a low signal because an element failure occurs, the counter 50 starts to operate. If this state continues for a predetermined time (corresponding to the first reference time mentioned above; in the example, about 50 milliseconds), both Q4 and Q3 outputs of the counter 50 go high and the high signal output by the AND gate 52 is sent to the protection circuit. Likewise, when SDL_in and FSL are low, if the NOR gate 47 outputs a low signal because an element failure occurs, the counter 51 starts to operate. If this state continues for the predetermined time (corresponding to the first reference time mentioned above; in the example, about 50 milliseconds), both Q4 and Q3 outputs of the counter 51 go high and the high signal output by the AND gate 53 is sent to the protection circuit.

If the signals SDR_out and SDL_out or FSR and FSL are high, the counters 50 and 51 are reset and thus the CK2 counting operation is not performed.

Next, the measures against (B) will be discussed.

The measures against (B) are not to maintain the DC lighting state and to temporarily inhibit (interrupt) the half-wave lighting state.

To begin with, the former can be realized by stopping the operation of the DC-DC converter having the voltage polarity to be output by the half bridge determined to be abnormal (opposite polarity to the output voltage polarity of the normal half bridge).

Figure 10:
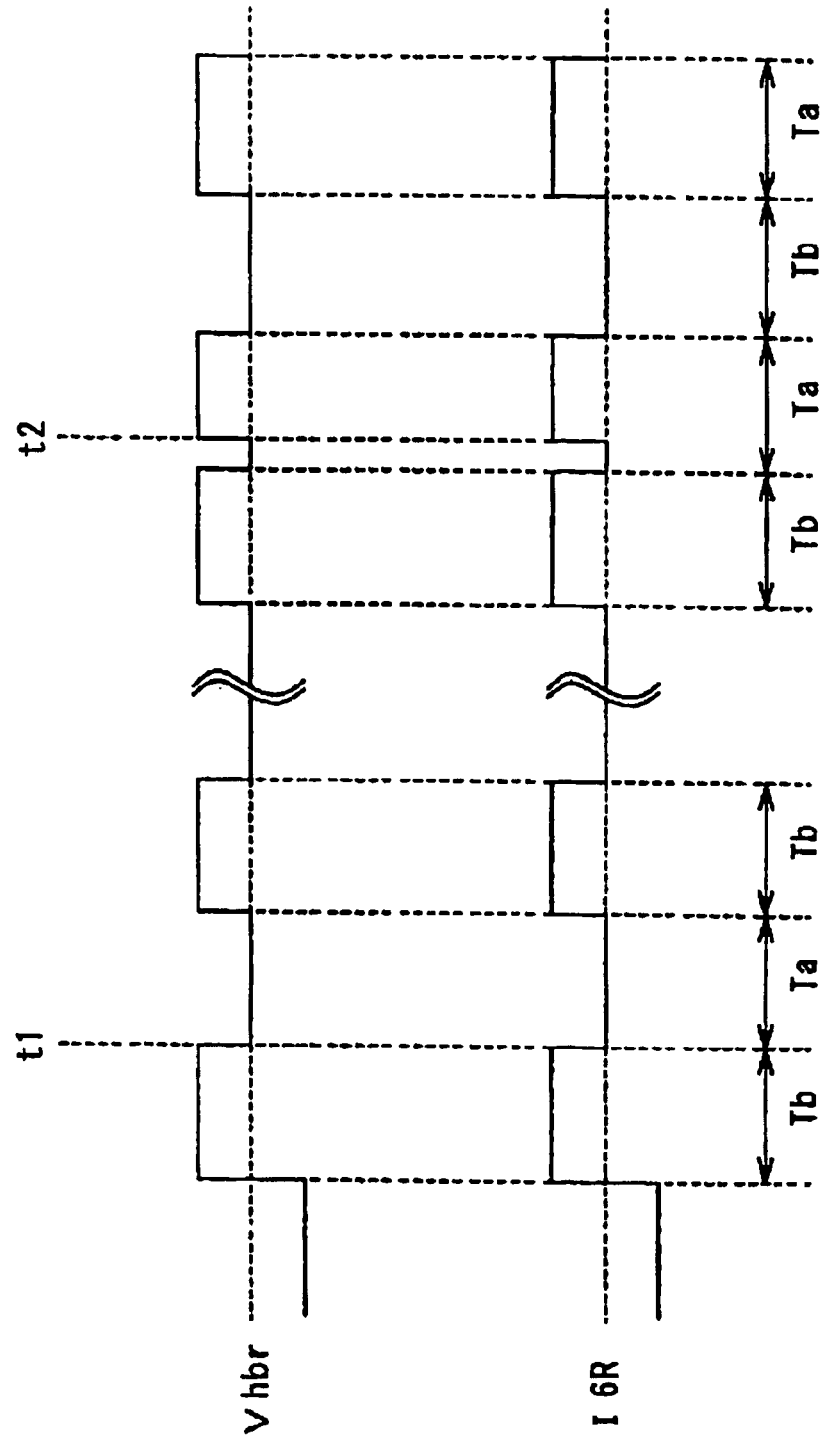
FIG. 10 is a drawing to describe operation stop of a DC-DC converter of voltage polarity to be output by the half bridge of the right arm determined to be abnormal.

FIG. 10 schematically shows operation stop of the DC-DC converter; it is assumed that a short-circuit failure occurs in the component sw3 of the right arm (HBR). The symbols shown in the figure have the following meanings:

Vhbr: Output voltage of half bridge HBR

I6R: Current flowing into discharge lamp 6R t1: Element failure time point t2: Element failure determination time point If the half bridge HBR is shut down at the time point t2 as the above-described failure determination is made after the element sw3 failed at the time point t1, Vdcp is output of HBR because of the failure of the element sw3. That is, if the through state is eliminated by giving an off command to the elements sw3 and sw4, Vdcp is maintained due to the failure of sw3 and consequently the polarity is fixed and the DC lighting state is entered as described above (see FIG. 6).

Then, if the operation of the DC-DC conversion circuit corresponding to the voltage polarity (in the example, Vdcp) to be output by the failing half bridge (in the example, HBR) is stopped, the output voltage of HBR (Vdcp) becomes zero at the timing at which the switching element sw2 is turned on after t2, namely, in time period Tb. Accordingly, the discharge lamp 6R receives no power supply and thus is switched off, whereby the DC lighting state can be prevented from occurring.

Preferably, such operation stopping of the DC-DC conversion circuit is applied not only to the case where it is determined that an anomaly caused by a failure of a component occurs, but also to the case where it is determined that any other anomaly containing an output anomaly, etc., occurs.

Figure 11:
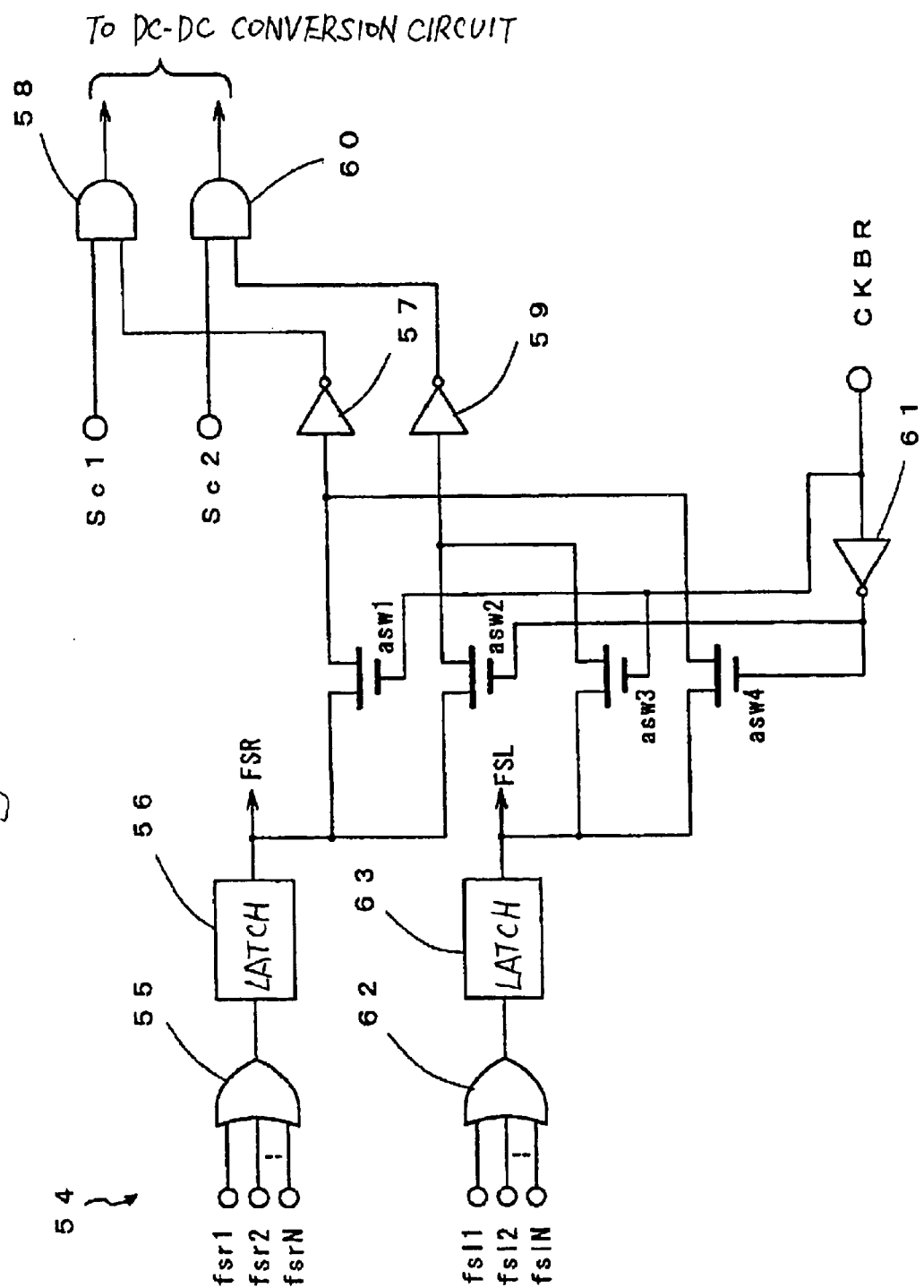
FIG. 11 is a circuit diagram to show a configuration example to stop the operation of the DC-DC converter.

FIG. 11 shows a circuit configuration example 54. The symbols shown in the figure have the following meanings:

fsr1-fsrN: Output signals provided by anomaly determination sections concerning discharge lamp 6R and HBR (containing anomaly determination section related to switching element failure)

fsl1-fslN: Output signals provided by anomaly determination sections concerning discharge lamp 6L and HBL (containing anomaly determination section related to switching element failure)

When the signals are high, an anomaly is indicated. The signals Sc1 and Sc2 are drive signals (for example, pulse width modulation signals) being sent from the control circuit 7 to the switching elements in the DC-DC conversion circuit 3M (see FIG. 3) for controlling positive and negative output voltages, as described above.

The signals fsr1-fsrN are sent to a multi-input OR gate 55 and an output signal of the gate 55 becomes a signal FSR through a latch circuit 56. The signal FSR is sent through an analog switch asw1 ((indicated by an abbreviated symbol in the figure) and a NOT gate 57 to a 2-input AND gate 58 and is also sent through an analog switch asw2 ((indicated by an abbreviated symbol in the figure) and a NOT gate 59 to a 2-input AND gate 60. The polarity inversion signal CKBR is supplied to a control terminal of the analog switch asw1, whereby on/off control is performed. The polarity inversion signal CKBR is supplied through a NOT gate 61 to a control terminal of the analog switch asw2, whereby on/off control is performed.

The signals fsl1-fslN are sent to a multi-input OR gate 62 and an output signal of the gate 62 becomes a signal FSL through a latch circuit 63. The signal FSL is sent through an analog switch asw3 ((indicated by an abbreviated symbol in the figure) and a NOT gate 59 to a 2-input AND gate 60 and is also sent through an analog switch asw4 ((indicated by an abbreviated symbol in the figure) and a NOT gate 57 to a 2-input AND gate 58. The polarity inversion signal CKBR is supplied to a control terminal of the analog switch asw3, whereby on/off control is performed. The polarity inversion signal CKBR is supplied through the NOT gate 61 to a control terminal of the analog switch asw4, whereby on/off control is performed.

Since an output signal of the NOT gate 57 and the drive signal Sc1 are input to the AND gate 58, if the output signal of the NOT gate 57 is high, the signal Sc1 passes through the gate intact.

Since an output signal of the NOT gate 59 and the drive signal Sc2 are input to the AND gate 60, if the output signal of the NOT gate 59 is high, the signal Sc2 passes through the gate intact.

In the circuit, for example, if any of the signals fsr1 to fsrN goes high, the high signal output by the OR gate 55 is held in the latch circuit 56. For example, the signal is used as FSR in FIG. 8 or a signal for making output of the AND gate 58 low to stop driving the switching element corresponding to the signal Sc1. That is, if the output of the latch circuit 56 goes high, when the polarity inversion signal CKBR is high, the analog switch asw1 is turned on and the low signal through the NOT gate 57 is sent to the AND gate 58 and therefore the signal Sc1 is blocked. When the polarity inversion signal CKBR is low, the analog switch asw2 is turned on and the low signal through the NOT gate 59 is sent to the AND gate 60.

Likewise, the latch signal corresponding to the output signal of the OR gate 62 (output signal of the latch circuit 63) is, for example, used as FSL in FIG. 8 or a signal for making output of the AND gate 60 low to stop driving the switching element corresponding to the signal Sc2. If the latch signal goes high, when the polarity inversion signal CKBR is high, the analog switch asw3 is turned on and the low signal through the NOT gate 59 is sent to the AND gate 60 and therefore the signal Sc2 is blocked. When the polarity inversion signal CKBR is low, the analog switch asw4 is turned on and the low signal through the NOT gate 59 is sent to the AND gate 58.

Thus, as for the half bridge determined to fail or to be abnormal, the converter operation corresponding to the voltage polarity to be output by the half bridge is stopped. If a failure occurs in the right arm and the right arm is shut down, to drive the left arm (HBL) to light the discharge lamp 6L or keep the discharge lamp 6L lit, Vdcp becomes output voltage of both the left and right arms at the timing at which the component sw1 of HBL is turned on, namely, in time period Ta and accordingly the possibility that a current will flow into the discharge lamp 6R or lighting control thereof will be performed is left. For example, in the configuration in which the current detection resistor (shunt resistor) is placed at the output stage of the DC-DC converter as shown in FIGS. 2 and 3, a situation is possible in which with the intention of lighting the discharge lamp 6L (performing power control of the output voltage and current of the DC-DC converter), in fact, the discharge lamp 6L is off and lighting control of the discharge lamp 6R is performed. That is, the discharge lamp 6R connected to the failing half bridge (right arm) is lit and switched off repeatedly (half-wave lighting state) in the polarity inversion period (period of CKBR) as shown in FIG. 10 and the discharge lamp 6L which should be lit is not correctly recognized because of a mix-up between the discharge lamps to be controlled (misidentification on lighting control) and therefore a state in which the discharge lamp 6L remains unable to be lit can occur. Then, to circumvent such a problem, it becomes necessary to inhibit (or interrupt) half-wave lighting of the discharge lamp 6R and light the discharge lamp 6L normally.

As a solution, preferably, for example, if discharge lamp is lit and switched off repeatedly each time the alternation operation of the half bridge is performed, the duration of the state is detected as the time or the number of times the discharge lamp has been lit and switched off, and the operation of the DC-DC conversion circuit is interrupted over a given time. That is, the following modes can be named:

(I) Mode in which if the state in which the discharge lamp is lit and switched off repeatedly continues over a predetermined determination reference time (second reference time), the operation of the DC-DC conversion circuit is stopped over a given time (third reference time); and (II) mode in which if the state in which the discharge lamp is lit and switched off repeatedly continues a predetermined number of determination times (first number of determination times), the operation of the DC-DC conversion circuit is stopped over a given time (third reference time).

Considering that half-wave lighting of repeatedly lighting and switching off in the polarity inversion period of the bridge can scarcely occur in discharge lamp lighting and that if it occurs, it continues only for a short time or only several times, if the state in which the discharge lamp is repeatedly lit and switched off occurs over a long time or a large number of times, the operation of the DC-DC conversion circuit is once stopped and energy supply to the discharge lamp is interrupted. Then, again a starter pulse may be applied to the discharge lamp for lighting the discharge lamp from the beginning. That is, it is determined that the continuation of the half-wave lighting state means that the possibility of the above-mentioned "misidentification on lighting control" is high, and to inhibit the state, the operation of the DC-DC conversion circuit is interrupted and the discharge lamp is again started, whereby the situation is saved and a turn for the better can be expected.

At the same time, if the state in which the discharge lamp is repeatedly lit and switched off continues over a fourth reference time shorter than the second reference time or continues a second number of determination times less than the first number of determination times, it is desirable that the frequency of the alternation output of the half bridge should be fixed to a constant value (for example, 500 Hz) to prevent a harmful effect caused by occurrence of DC lighting time period for starting (time period in which the voltage polarity is temporarily fixed) during the determination time period as to the state in which the discharge lamp is repeatedly lit and switched off. That is, if the mode in which the continuation of half-wave lighting is determined by comparing with the second reference time is adopted, when DC lighting time period occurs before the expiration of the reference time, the number of times the discharge lamp has been lit and switched off repeatedly is drastically decreased and thus the accuracy of the determination is worsened. If the mode in which the continuation of half-wave lighting is determined by comparing with the first number of determination times is adopted, when DC lighting time period occurs before the determination, harmful effects caused by prolonging the time required until the determination result is obtained (shortening the life of discharge lamp, degradation of discharge lamp, expansion of damage caused by failure, etc.,) introduce a problem. This is caused by the fact that the length of the DC lighting time period is longer than the polarity inversion period.

In any mode, it is desirable that polarity inversion should be conducted in a constant period without containing the DC lighting time period so that a more reliable and rapid determination can be made. To do this, the fourth reference time is set shorter than the second reference time or the second number of determination times is set less than the first number of determination times and the polarity inversion operation is performed with a constant frequency.

If the length of the third reference time, the operation stop (interrupt) time of the DC-DC conversion circuit is too short or too long, a problem arises. That is, if the time is short (for example, several milliseconds), there is a possibility that half-wave lighting will be started without performing the lighting operation started by a starter pulse at the restoration time from the interrupt although it depends on the state of the discharge lamp; in contrast, if the time is long, the off time of the discharge lamp is prolonged and thus, for example, in application to vehicle light, the adverse effect on the driver's view, etc., (a sense of incompatibility, etc.,) introduces a problem.

Figure 12:
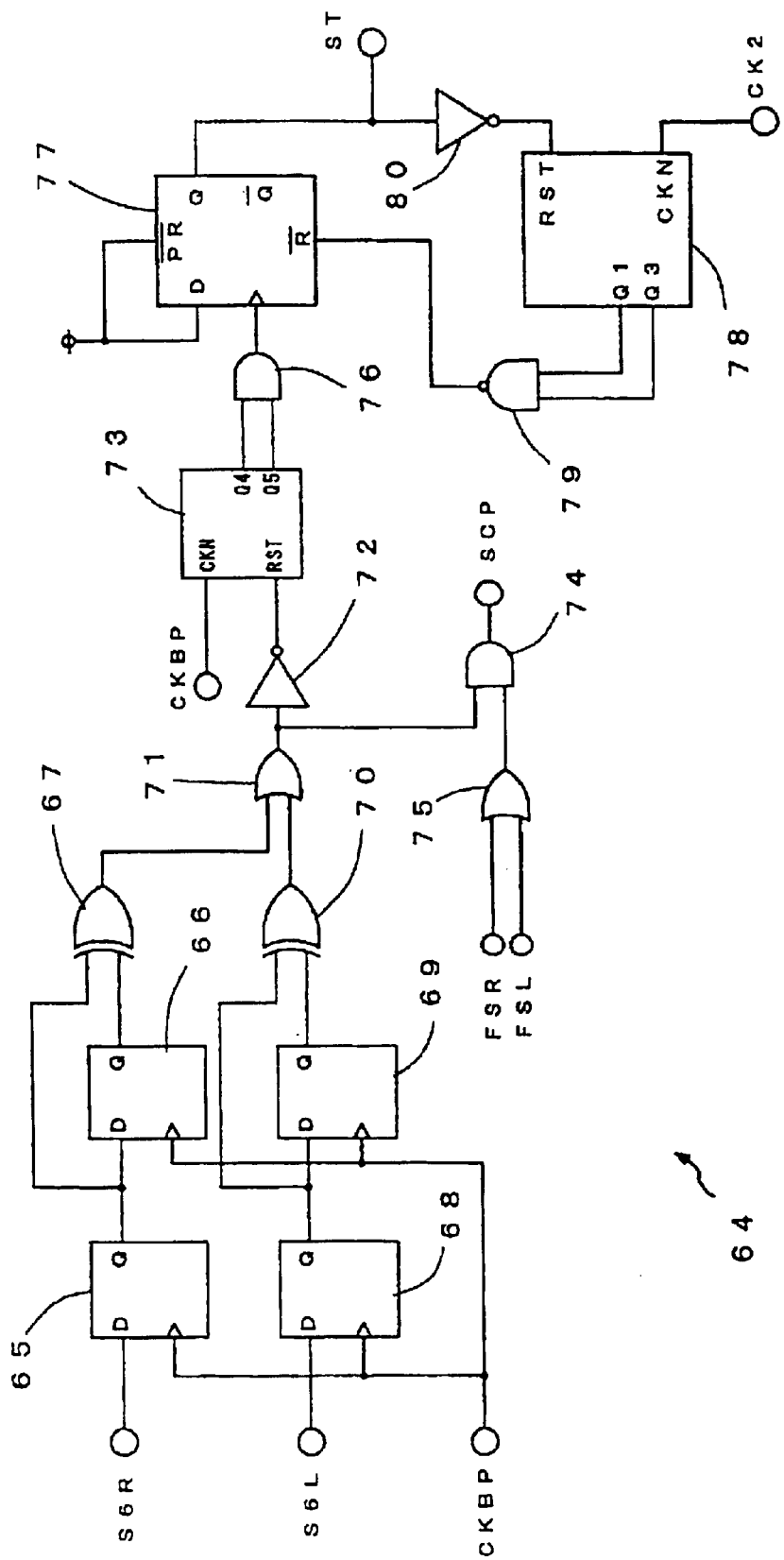
FIG. 12 is a circuit diagram to show a configuration example for interrupting a half-wave lighting state.
Figure 13:
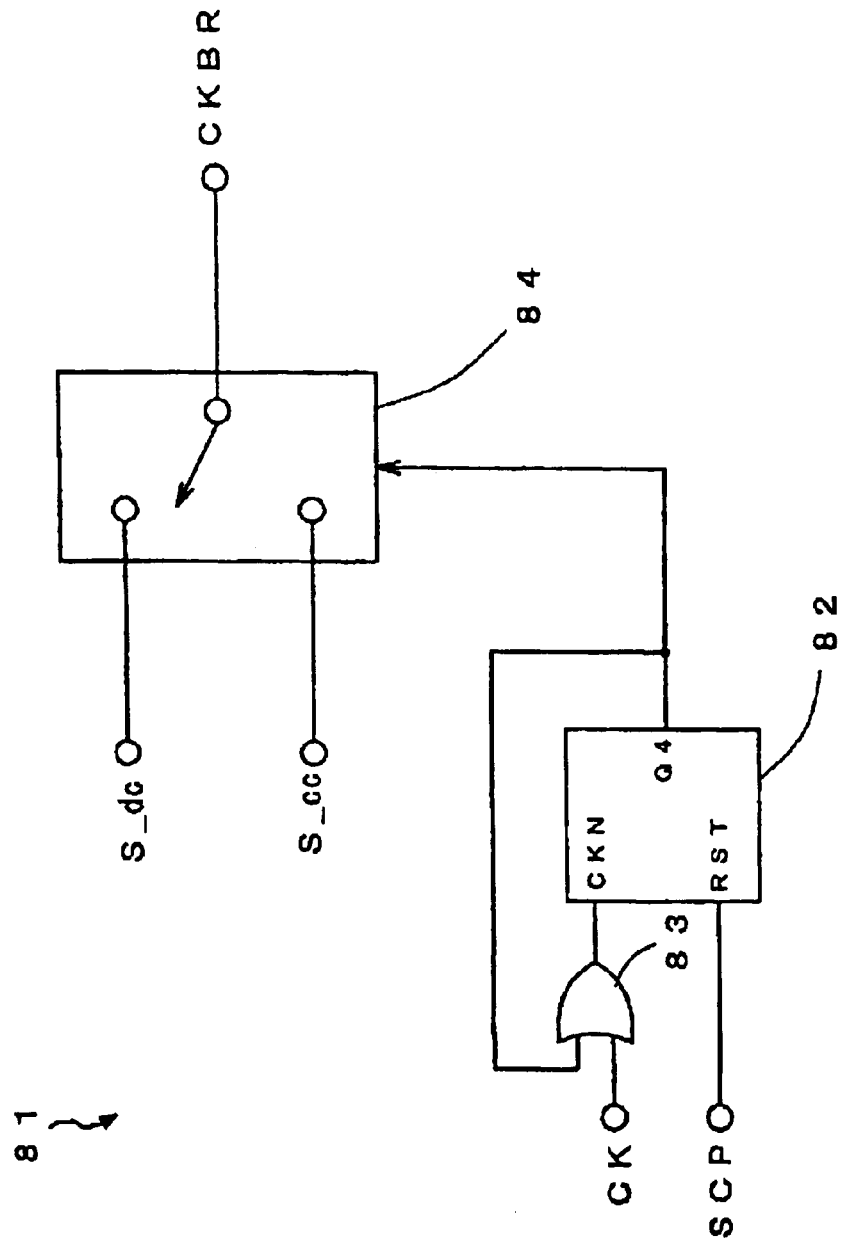
FIG. 13 is a drawing to describe a configuration example for fixing a polarity inversion signal CKBR to a given period.
Figure 14:
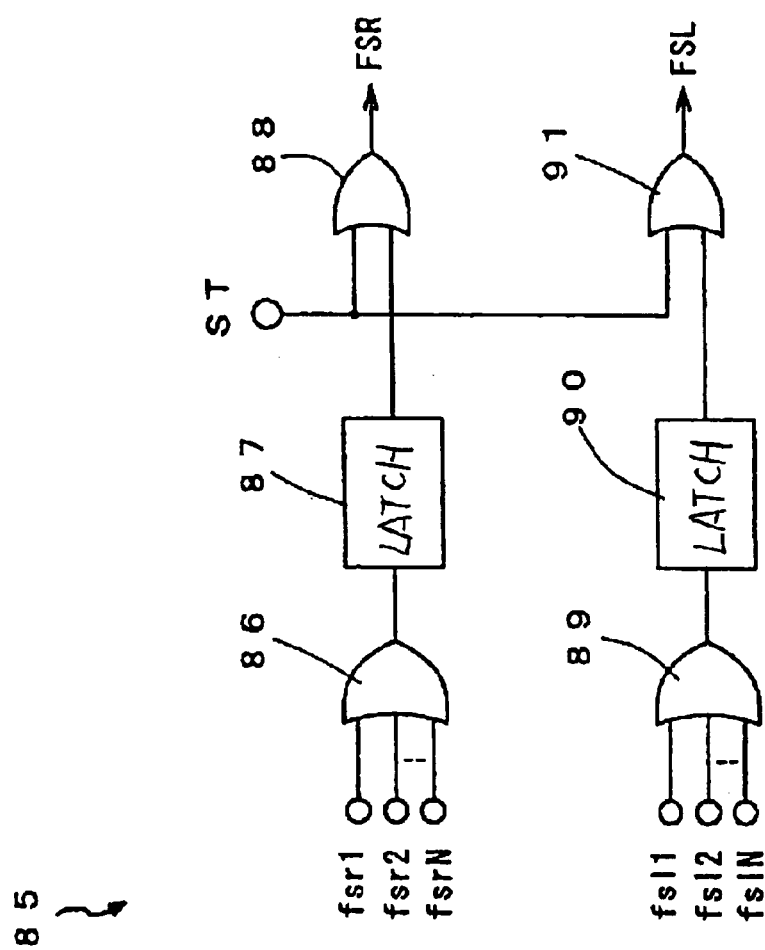
FIG. 14 is a drawing to show a processing circuit example about an interrupt signal ST.

FIGS. 12 to 14 show circuit configuration examples; the mode (II) is adopted. The first number of determination times is set to 24, the third reference time is set to 16 milliseconds, and the second number of determination times is set to one.

The symbols shown in FIG. 12 have the following meanings:

S6R: Signal indicating whether or not discharge lamp 6R is lit (when the signal is high, it indicates that the discharge lamp 6R is lit; when low, off).

S6L: Signal indicating whether or not discharge lamp 6L is lit (when the signal is high, it indicates that the discharge lamp 6L is lit; when low, off).

ST: Control signal to interrupt operation of DC-DC conversion circuit (when the signal is high, it indicates an interrupt command).

SCP: Control signal to make polarity inversion period (or frequency) constant (when the signal is high, it indicates a constant-period command).

As circuits for providing 56R and S6L, a configuration for comparing the current flowing into the discharge lamp with a threshold value, thereby making a determination, a configuration for detecting light, heat, etc., of the discharge lamp, thereby making a determination, and the like are known.

In a circuit 64 shown in FIG. 12, the signal S6R is input to a D terminal of a D flip-flop 65 and Q output of the D flip-flop 65 is sent to a D terminal of a D flip-flop 66 following the D flip-flop 65 and one input terminal of a 2-input Ex-OR (exclusive OR) gate 67. Q output of the D flip-flop 66 is supplied to the other input terminal of the Ex-OR gate 67. The polarity inversion pulse signal CKBP is supplied to clock signal input terminals of the D flip-flops 65 and 66 as a sampling pulse.

The signal S6L is input to a D terminal of a D flip-flop 68 and Q output of the D flip-flop 68 is sent to a D terminal of a D flip-flop 69 following the D flip-flop 68 and one input terminal of a 2-input Ex-OR (exclusive OR) gate 70. Q output of the D flip-flop 69 is supplied to the other input terminal of the Ex-OR gate 70. The polarity inversion pulse signal CKBP is supplied to clock signal input terminals of the D flip-flops 68 and 69 as a sampling pulse.

Output signals of the Ex-OR gates 67 and 70 are sent to a 2-input OR gate 71 and an output signal of the OR gate 71 is sent through a NOT gate 72 to a reset terminal (RST) of a counter 73 and a 2-input AND gate 74.

The above-described signals FSR and FSL are supplied through a 2-input OR gate 75 to the AND gate 74 for ANDing the signal and the output signal of the OR gate 71. The result becomes the signal SCP.

The polarity inversion pulse signal CKBP is supplied to a clock signal input terminal (CKN) of the counter 73 and when the signal has been counted by the first number of determination times, high signals as Q4 and Q5 outputs are sent to a 2-input AND gate 76.

A D flip-flop 77 comprises a preset terminal (PR) and a reset terminal (R) which are active low (in the figure, an overline is put on each symbol), and a high signal is supplied to a D terminal and the PR terminal. An output signal of the AND gate 76 is supplied to a clock signal input terminal of the D flip-flop 77.

A clock signal CK2 (for example, 250 Hz) is supplied to a clock signal input terminal of a counter 78. The signal is counted and when the third reference time has elapsed, high signals as Q1 and Q3 outputs are sent to a NAND (nonconjunction) gate 79.

An output signal of the NAND gate 79 is supplied to the reset terminal (R) of the D flip-flop 77 and Q output of the D flip-flop 77 becomes the interrupt signal ST, which is then supplied through a NOT gate 80 to a reset terminal (RST) of the counter 78.

In the circuit, when either discharge lamp changes from lighting state to off state or from off state to lighting state, the output signal of the Ex-OR gate 67 or 70 goes high. For example, when the signal S6R makes a high to low transition, the Ex-OR gate 67 outputs a high signal.

Since the signal is sent through the OR gate 71 to the AND gate 74, if the output signal of the OR gate 75 is high, namely, if an anomaly determination is made as to FSR or FSL, the output signal of the OR gate 71 passes through the AND gate 74 intact and becomes the signal SCP.

As for reset input of the counter 73, when the signal goes low through NOT gate 72, counting of CKBP is started. When the counter 73 counts up as it counts CKBP 24 times (namely, it means that the half-wave lighting state is repeated 24 times and continues), the AND gate 76 outputs a high signal and thus the Q output of the D flip-flop 77 goes high and therefore the signal ST goes high (interrupt is started).

While the signal ST is low, the counter 7B is reset by the high signal through the NOT gate 80. When the signal ST goes high, counting of CK2 is started. Q1 and Q3 outputs go high in 16 milliseconds and a low signal is supplied from the NAND gate 79 to the reset terminal (R) of the D flip-flop 77. At this time, Q output goes low, namely, the signal ST goes low (interrupt is released), and the counter 78 is reset.

While the operation of the DC-DC conversion circuit 3 stops, both the discharge lamps are off (S6R and S6L are low) and thus the low signal output by the OR gate 71 is inverted by the NOT gate 72 and the counter 73 is reset.

In the example, two flip-flops are provided at the input stage of each Ex-OR gate; if the number of flip-flops is increased, the number of times and the time can be increased. Various embodiments are possible wherein timer means is provided, etc., for determining the state in which the discharge lamp is repeatedly lit and switched off by the time rather than the number of times.

FIG. 13 shows an example 81 of a processing circuit using the signal SCP.

The signal SCP is supplied to a reset terminal (RST) of a counter 82 and a clock signal CK (for example, 2 kHz) is supplied through a 2-input OR gate 83 to a clock signal input terminal (CKN) of the counter 82. Q4 output of the counter 82 is sent to an input terminal of the OR gate 83 and is also sent to a signal selection circuit 84 (conceptually shown as an equivalent switch in the figure) as control output.

A polarity fixing control signal S_dc for the DC lighting time period and a rectangular wave signal S_cc of a constant frequency (for example, 500 Hz) are input to the signal selection circuit 84. When the output signal of the counter 82 is high, S_dc is selected and becomes the polarity inversion signal CKBR; when the output signal of the counter 82 is low, S_cc is selected and becomes the polarity inversion signal CKBR.

Thus, when the signal SCP once goes high, if the signal later makes a high to low transition, the Q4 output of the counter 82 goes low at least for four milliseconds and is sent to the signal selection circuit 84. Consequently, S_cc is selected and CKBR is defined so that it forcibly becomes a signal of a constant frequency. If the signal SCP makes a low to high transition, immediately the counter 82 is reset and the Q4 output goes low.

FIG. 14 shows an example 85 of a processing circuit using the signal ST.

The signals fsr1 to fsrN are supplied from a multi-input OR gate 86 through a latch circuit 87 to one input terminal of a 2-input OR gate 88, and the signal ST is supplied to the other input terminal of the OR gate 88. An output signal of the OR gate 88 becomes FSR.

The signals fsl1 to fslN are supplied from a multi-input OR gate 89 through a latch circuit 90 to one input terminal of a 2-input OR gate 91, and the signal ST is supplied to the other input terminal of the OR gate 91. An output signal of the OR gate 91 becomes FSL.

Thus, the signal ST needs to be unlatched and when the signal ST is high, it needs to pass through the OR gate 88, 91 intact and become FSR or FSL. The reason is that the signal ST is intended for interrupting and if the ST signal is latched, the operation of the DC-DC conversion circuit 3 cannot be restarted. Therefore, while the signal ST is high (during interrupting), the operation of the DC-DC conversion circuit 3 stops. At the time, both the half bridges making up the DC-AC conversion circuit may or may not be shut down.

Last, the measures against (C) will be discussed.

There are variations in characteristics of discharge gap elements and if only the starter circuit comprising discharge gap element low in discharge voltage generates a starter pulse, a problem arises. That is, if the starter circuits generate pulses alternately, the discharge lamp connected to the normal half bridge can be lit and once the discharge lamp is lit, the problem of "misidentification on lighting control" described above is eliminated and the discharge lamp connected to the failing half bridge is not lit. To generate a pulse by another starter circuit after a pulse is generated by one starter circuit, it is possible to provide a control circuit for forcibly alternating the operation timings, etc., of the starter circuits, but the circuit configuration becomes complicated and the costs are increased. Thus, preferably the charging path of the capacitor in the starter circuit is designed.

Figure 15:
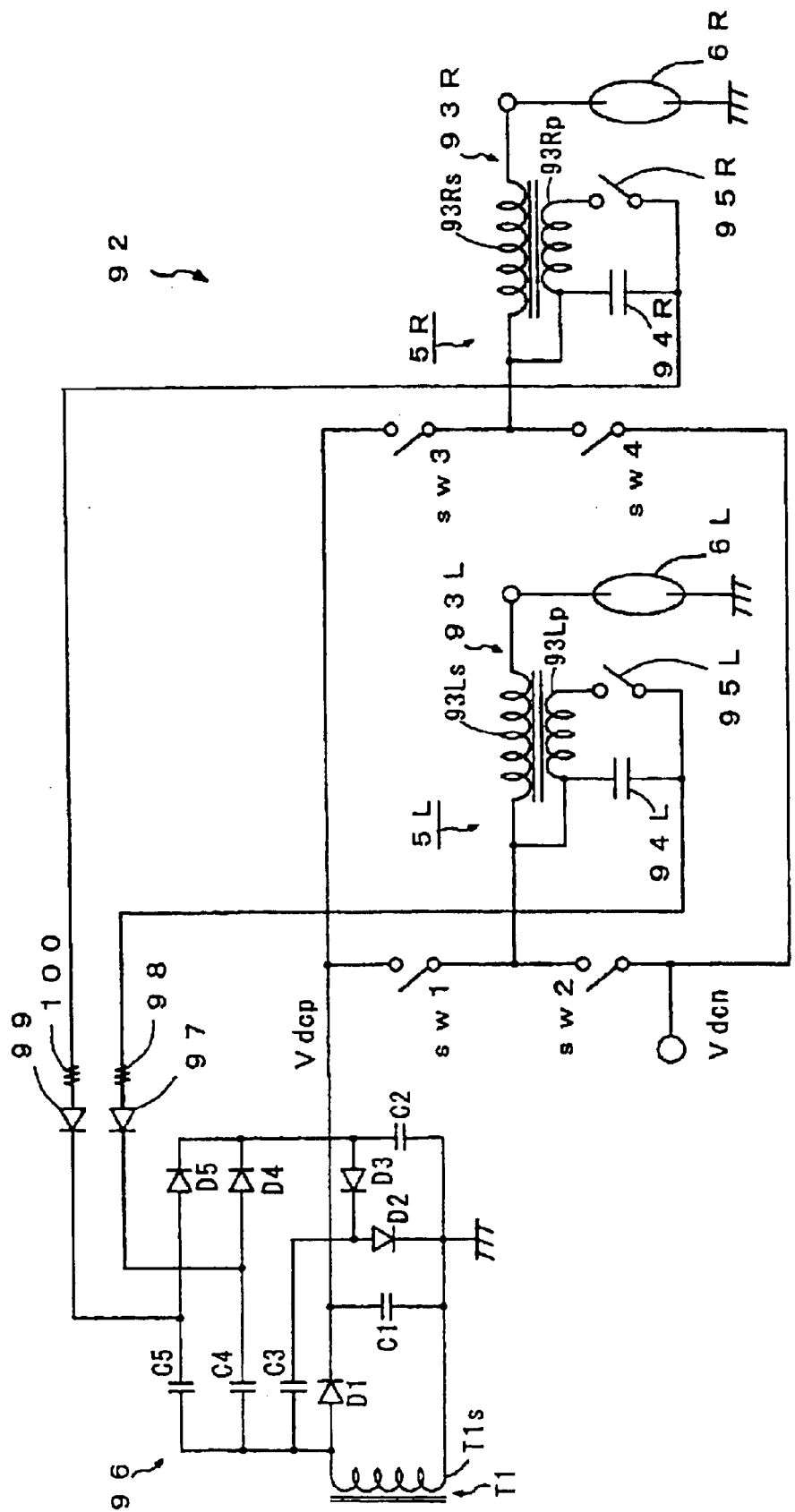
FIG. 15 is a circuit diagram to describe generation of starter pulses to the discharge lamps.

FIG. 15 shows an example 92 of such a circuit configuration; it shows the main part of the portion on and after the secondary winding T1s of the converter transformer T1 forming a part of the DC-DC conversion circuit.

Each starter circuit 5L, 5R comprises a transformer, a capacitor, and a switch element and when the voltage across the capacitor exceeds a threshold value, the switch element (discharge gap element) is brought into conduction, generating a starter pulse.

For example, a secondary winding 93Ls of a transformer 93L in the starter circuit 5L is connected at one end to the connection point of the switching elements sw1 and sw2 (indicated by switch symbols in the figure) of the left arm and is connected at an opposite end to the discharge lamp 6L. A primary winding 93Lp of the transformer 93L is connected at one end to the connection point of the switching elements sw1 and sw2 and one end of a capacitor 94L and is connected at an opposite end through a switch element 95L (indicated by a switch symbol in the figure) to an opposite end of the capacitor 94L.

The starter circuit 5R has the same configuration as the starter circuit 5L and therefore will not be discussed because "L" in the symbols used in the description may be replaced with "R" and "sw1" maybe replaced with "Sw3" and "sw2" maybe replaced with "sw4."

A voltage supply circuit (or charge supply circuit) 96 consisting of diodes D2 to D5 and capacitors C2 to C5 in addition to the diode D1 and the capacitor C1 is connected to the secondary winding T1 of the converter transformer T1. For simplifying the description of the operation of the circuit, it is assumed that the circuit is configured for providing a voltage required for generating a starter pulse from the connection point of the capacitor C4 and the diode D4 or the connection point of the capacitor C5 and the diode D5 as a result of charging the capacitors and transferring charges between the capacitors via the diode.

The connection point of the capacitor C4 and the diode D4 is connected through a diode 97 and a resistor 98 to the connection point of the capacitor 94L and the switch element 95L in the starter circuit 5L, and the connection point of the capacitor C5 and the diode D5 is connected through a diode 99 and a resistor 100 to the connection point of the capacitor 94R and the switch element 95R in the starter circuit 5R.

In the circuit, for example, to light the discharge lamp 6R, only the component sw3 of the right arm (HBR) is turned on and the left arm (HBL) is shut down or the component sw2 of the left arm is turned on. Assuming that Vdcp rises, for example, to the open circuit voltage 350V as the operation of the comparator related to positive output is performed and that the voltage provided through the diode 99 and the resistor 100 from the connection point of the capacitor C5 and the diode D5 in the voltage supply circuit 96 is −700 V, charges corresponding to a maximum of 1050 V can be stored in the capacitor 94R in the starter circuit SR (in contrast, charges corresponding to the "700+Vdcn" voltage can only be stored in the capacitor 94L in the starter circuit 5L because the switching element sw1 is off). Therefore, for example, if a gap element which self-breaks down at about 800 V is used, a starter pulse is applied only to the discharge lamp 6R as intended.

Figure 16:
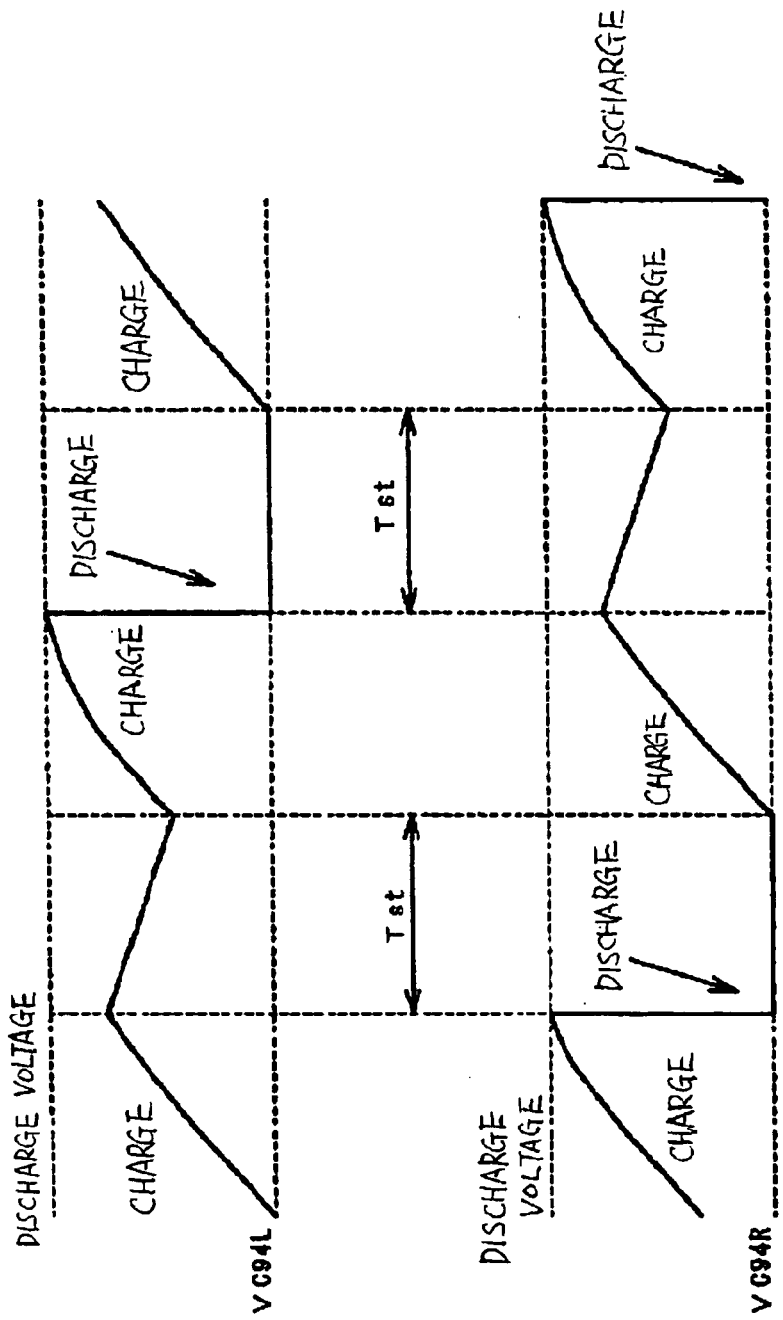
FIG. 16 is a drawing to describe the capacitor charge and discharge state in starter circuits.

The important points in the circuit are that the capacitor charging paths in the starter circuits are separated from the midpoint of the voltage supply circuit 96 and that when the operation of the DC-DC conversion circuit is interrupted, a charge move is suppressed between the capacitors. Accordingly, the starter circuits generate the starter pulses alternately, as shown in FIG. 16. The symbols shown in the figure have the following meanings:

VC94L: Terminal voltage of capacitor 94L in starter circuit 5L

VC94R: Terminal voltage of capacitor 94R in starter circuit 5R

The figure shows a situation when the operation of the DC-DC conversion circuit is interrupted in time period Tst and interrupt and restart are repeated.

As for the description of (C), for example, a situation may be assumed in which the capacitor C5 and the diodes D5 and 99 are removed and one end of the resistor 100 is connected to an anode of the diode 97 in the configuration shown in FIG. 15 and the component sw1 of the left arm (HBL) fails. That is, in this case, to turn on the component sw3 of the right arm and charge the capacitor 94R in attempting to light the discharge lamp 6R, the capacitor 94L is also charged because of the failure of the element sw1 and consequently it is always the starter circuit having the discharge gap element lower in the discharge voltage that can generate a starter pulse.

In contrast, in the configuration in FIG. 15, if one starter circuit, for example, 5R generates a starter pulse, the charges accumulated in the capacitor 94R in the starter circuit are discharged and the voltage across the capacitor 94R becomes near to zero volts. As for the other starter circuit that cannot generate a starter pulse this time, 5L, the capacitor 94L remains charged near to the discharge voltage of the discharge gap element and thus, for example, when the operation of the DC-DC conversion circuit is restarted after being interrupted in the time period Tst, the capacitor 94L is charged and when the voltage across the capacitor 94L reaches the discharge voltage of the discharge gap element, a starter pulse can be generated (see FIG. 16).

A resistor (electric shock prevention resistor) may be provided in parallel with a capacitor in a starter circuit for the purpose of preventing an electric shock at the manufacturing time, the shipment inspection time, etc. In the configuration in FIG. 15, it is considered that the capacitors 94L and 94R are prevented from becoming the same voltage via the resistor and the resistors 98 and 100 (to prevent only the discharge gap element lower in the discharge voltage from always being discharged) and a charge move between the two capacitors via the resistors is suppressed.

As seen from the description given above, according to the invention, an abnormal state when a failure occurs in any of the switching elements making up the half bridge can be detected reliably. Thus, the harmful effect caused by erroneous detection, etc., can be prevented.

According to the invention, if an abnormal state continues over the predetermined time, it is determined that a failure occurs, and the components of the half bridge are defined so that they are turned off, whereby expansion of circuit damage, etc., can be prevented.

According to the invention, to locate the failing half bridge, the components of one half bridge are turned off and in this state, whether or not the abnormal state still continues is determined and which half bridge fails is determined and necessary and sufficient protection measures can be taken. This means that the discharge lamp connected to the normal half bridge can be lit normally.

According to the invention, maintaining of DC lighting of the discharge lamp connected to the failing half bridge through the component of the failing half bridge is prevented, so that degradation of the discharge lamp, heating of the switching element, etc., can be prevented.

According to the invention, half-wave lighting of the discharge lamp connected to the failing half bridge can be interrupted and the discharge lamp connected to the normal half bridge can be lit normally. A reliable and rapid determination can be made as to the misidentification on lighting control described above.

According to the invention, at the determining time as to the state in which the discharge lamp is repeatedly lit and switched off, the alternation output of the half bridge is fixed to a given frequency, so that the harmful effect caused by occurrence of DC lighting time period during the determination period can be prevented.

According to the invention, starter pulses are generated alternately by the starter circuits without generating a starter pulse only by a specific switch element, so that to light the discharge lamp connected to the normal half bridge, the starter pulse can be applied to the discharge lamp.

What is claimed is:

1. A discharge lamp lighting circuit comprising:
   a DC-DC conversion circuit for receiving a DC input voltage and converting the voltage into positive and negative output voltages;
   a DC-AC conversion circuit having a plurality of half bridges for receiving the positive and negative output voltages provided by the DC-DC conversion circuit and outputting either positive or negative voltage;
   a starter circuit for receiving power from each half bridge and supplying the power to each discharge lamp; and
   an anomaly detection circuit for determining that a failure occurs in any of switching elements making up the half bridges if the positive and negative output voltages or the output voltages of the half bridges becomes lower than a predetermined threshold value.

2. The discharge lamp lighting circuit as claimed in claim 1 wherein if said anomaly detection circuit determines that a failure occurs since an abnormal state is detected about a failure of a component of half bridge and continues over a first reference time when only either of the two discharge lamps is lit, the components of the half bridge to which the discharge lamp is connected are defined so that they are turned off.

3. The discharge lamp lighting circuit as claimed in claim 2, wherein the operation of the DC-DC conversion circuit corresponding to the voltage polarity to be output by the half bridge whose component is determined to fail or to be abnormal is stopped.

4. The discharge lamp lighting circuit as claimed in claim 3 wherein if the discharge lamp is lit and switched off repeatedly each time the alternation operation of the half bridge is performed and this state continues over a second reference time or a first number of determination times, the operation of the DC-DC conversion circuit is interrupted over a third reference time.

5. The discharge lamp lighting circuit as claimed in claim 4 wherein if the discharge lamp is lit and switched off repeatedly each time the alternation operation of the half bridge is performed and this state continues over a fourth reference time shorter than the second reference time or a second number of determination times less than the first number of determination times, the alternation output of the half bridge is fixed to a constant frequency.

6. The discharge lamp lighting circuit as claimed in claim 4, wherein each starter circuit comprises a capacitor and a switch element and when the voltage of the capacitor exceeds a threshold value, the switch element is brought into conduction and a starter pulse is generated, and wherein capacitor charging paths of the starter circuits are separated and when the operation of the DC-DC conversion circuit is interrupted, a charge move is suppressed between capacitors and if the operation of the DC-DC conversion circuit is interrupted repeatedly, the starter circuits generate the starter pulses alternately.

7. The discharge lamp lighting circuit as claimed in claim 5, wherein each starter circuit comprises a capacitor and a switch element and when the voltage of the capacitor exceeds a threshold value, the switch element is brought into conduction and a starter pulse is generated, and wherein capacitor charging paths of the starter circuits are separated and when the operation of the DC-DC conversion circuit is interrupted, a charge move is suppressed between capacitors and if the operation of the DC-DC conversion circuit is interrupted repeatedly, the starter circuits generate the starter pulses alternately.

8. The discharge lamp lighting circuit as claimed in claim 1, wherein when the two discharge lamps are lit, if said anomaly detection circuit detects an abnormal state about a failure of a component of half bridge, the components of the half bridge to which one of the discharge lamps is connected are defined temporarily so that they are turned off, and if the abnormal state continues, when the abnormal state continues over the first reference time, the anomaly detection circuit determines that a failure occurs in the other discharge lamp.

9. The discharge lamp lighting circuit as claimed in claim 8, wherein the operation of the DC-DC conversion circuit corresponding to the voltage polarity to be output by the half bridge whose component is determined to fail or to be abnormal is stopped.

10. The discharge lamp lighting circuit as claimed in claim 9, wherein if the discharge lamp is lit and switched off repeatedly each time the alternation operation of the half bridge is performed and this state continues over a second reference time or a first number of determination times, the operation of the DC-DC conversion circuit is interrupted over a third reference time.

11. The discharge lamp lighting circuit as claimed in claim 10, wherein if the discharge lamp is lit and switched off repeatedly each time the alternation operation of the half bridge is performed and this state continues over a fourth reference time shorter than the second reference time or a second number of determination times less than the first number of determination times, the alternation output of the half bridge is fixed to a constant frequency.

12. The discharge lamp lighting circuit as claimed in claim 10, wherein each starter circuit comprises a capacitor and a switch element and when the voltage of the capacitor exceeds a threshold value, the switch element is brought into conduction and a starter pulse is generated, and wherein capacitor charging paths of the starter circuits are separated and when the operation of the DC-DC conversion circuit is interrupted, a charge move is suppressed between capacitors and if the operation of the DC-DC conversion circuit is interrupted repeatedly, the starter circuits generate the starter pulses alternately.

13. The discharge lamp lighting circuit as claimed in claim 11, wherein each starter circuit comprises a capacitor and a switch element and when the voltage of the capacitor exceeds a threshold value, the switch element is brought into conduction and a starter pulse is generated, and wherein capacitor charging paths of the starter circuits are separated and when the operation of the DC-DC conversion circuit is interrupted, a charge move is suppressed between capacitors and if the operation of the DC-DC conversion circuit is interrupted repeatedly, the starter circuits generate the starter pulses alternately.

14. The discharge lamp lighting circuit as claimed in claim 1, wherein when the two discharge lamps are lit, if said anomaly detection circuit detects an abnormal state about a failure of a component of the first half bridge, the components of the half bridge to which one of the discharge lamps is connected are defined temporarily so that they are turned off, and if the abnormal state continues, when the abnormal state continues over the first reference time, it is determined that a failure occurs in the second half bridge and the components of the half bridge are defined so that they are turned off, and wherein when the two discharge lamps are lit, the abnormal state is detected and when the components of the first half bridge are defined so that they are turned off, if the abnormal state does not continue, then the components of the second half bridge are defined temporarily so that they are turned off, and whether or not the abnormal state again occurs at the time is checked and if the abnormal state again occurs, when the abnormal state continues over the first reference time, it is determined that a failure occurs in the first half bridge, and the components of the half bridge are defined so that they are turned off.

15. The discharge lamp lighting circuit as claimed in claim 14, wherein the operation of the DC-DC conversion circuit corresponding to the voltage polarity to be output by the half bridge whose component is determined to fail or to be abnormal is stopped.

16. The discharge lamp lighting circuit as claimed in claim 15, wherein if the discharge lamp is lit and switched off repeatedly each time the alternation operation of the half bridge is performed and this state continues over a second reference time or a first number of determination times, the operation of the DC-DC conversion circuit is interrupted over a third reference time.

17. The discharge lamp lighting circuit as claimed in claim 16, wherein if the discharge lamp is lit and switched off repeatedly each time the alternation operation of the half bridge is performed and this state continues over a fourth reference time shorter than the second reference time or a second number of determination times less than the first number of determination times, the alternation output of the half bridge is fixed to a constant frequency.

18. The discharge lamp lighting circuit as claimed in claim 16, wherein each starter circuit comprises a capacitor and a switch element and when the voltage of the capacitor exceeds a threshold value, the switch element is brought into conduction and a starter pulse is generated, and wherein capacitor charging paths of the starter circuits are separated and when the operation of the DC-DC conversion circuit is interrupted, a charge move is suppressed between capacitors and if the operation of the DC-DC conversion circuit is interrupted repeatedly, the starter circuits generate the starter pulses alternately.

19. The discharge lamp lighting circuit as claimed in claim 17, wherein each starter circuit comprises a capacitor and a switch element and when the voltage of the capacitor exceeds a threshold value, the switch element is brought into conduction and a starter pulse is generated, and wherein capacitor charging paths of the starter circuits are separated and when the operation of the DC-DC conversion circuit is interrupted, a charge move is suppressed between capacitors and if the operation of the DC-DC conversion circuit is interrupted repeatedly, the starter circuits generate the starter pulses alternately.

* * * * *